(12) United States Patent
Kittner

(10) Patent No.: US 10,210,043 B2
(45) Date of Patent: *Feb. 19, 2019

(54) SYSTEM AND METHOD FOR PERFORMING SIMULTANEOUS READ AND WRITE OPERATIONS IN A MEMORY

(71) Applicant: Marvell Israel (M.I.S.L) Ltd., Yokneam (IL)

(72) Inventor: Yaron Kittner, Pardes Hanna-Karkur (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,804

(22) Filed: Sep. 18, 2017

(65) Prior Publication Data

US 2018/0004603 A1    Jan. 4, 2018

Related U.S. Application Data

(63) Continuation of application No. 14/964,219, filed on Dec. 9, 2015, now Pat. No. 9,766,978.

(Continued)

(51) Int. Cl.
*G11C 29/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0673* (2013.01); *G06F 11/1044* (2013.01)

(58) Field of Classification Search
CPC ............. G06F 11/1076; G06F 11/1044; G06F 3/0619; G06F 3/064; G06F 3/0673
See application file for complete search history.

(56) References Cited

U.S. PATENT DOCUMENTS 4,870,643 A    9/1989 Bultman et al.
5,414,455 A    5/1995 Hooper et al.
(Continued)

FOREIGN PATENT DOCUMENTS

WO    WO-02/071230 A1    9/2002
WO    WO-2008/121306 A2    10/2008
WO    WO-2010071655 A1    6/2010

OTHER PUBLICATIONS

International Search Report and Written Opinion in International Application No. PCT/IB2015/002428, dated Mar. 30, 2016 (10 pages).

*Primary Examiner* — Samir W Rizk

(57) ABSTRACT

A network device includes: a set of content memory banks including a first memory bank; a parity memory bank; a first memory interface; and a second memory interface. The first memory interface is configured to perform a write operation to write new content data to a location in a first content memory bank in a plurality of partial write operations that are spread over two or more clock cycles, including: generating new parity information for the new content data using old content data at the location in the first content memory bank, and storing the new parity information to the parity memory bank. The second memory interface is configured to perform a read operation at the location in the first content memory bank concurrently while the first memory interface is performing at least one of the plurality of partial write operations.

20 Claims, 8 Drawing Sheets

Related U.S. Application Data

(60) Provisional application No. 62/089,428, filed on Dec. 9, 2014.

(56) References Cited

U.S. PATENT DOCUMENTS

| | | |
|---|---|---|
| 5,508,732 A | 4/1996 | Bottomley et al. |
| 5,581,479 A | 12/1996 | McLaughlin et al. |
| 5,621,882 A | 4/1997 | Kakuta |
| 5,636,139 A | 6/1997 | McLaughlin et al. |
| 5,893,919 A | 4/1999 | Sarkozy et al. |
| 6,397,324 B1 | 5/2002 | Barry et al. |
| 7,437,472 B2 | 10/2008 | Rose |
| 7,451,467 B2 | 11/2008 | Carver et al. |
| 7,934,120 B2 | 4/2011 | Zohar et al. |
| 8,358,651 B1 | 1/2013 | Kadosh et al. |
| 8,402,217 B2 | 3/2013 | Burd |
| 8,514,651 B2 | 8/2013 | Levy et al. |
| 9,766,978 B2 | 9/2017 | Kittner |
| 2003/0046477 A1 | 3/2003 | Jeddeloh |
| 2003/0120861 A1 | 6/2003 | Calle et al. |
| 2004/0090840 A1 | 5/2004 | Lee et al. |
| 2004/0107308 A1 | 6/2004 | Andreev et al. |
| 2006/0282588 A1 | 12/2006 | Proujansky-Bell |
| 2011/0047439 A1 | 2/2011 | Jorda et al. |
| 2012/0127818 A1 | 5/2012 | Levy et al. |
| 2013/0024613 A1 | 1/2013 | Benhase et al. |
| 2013/0205183 A1 | 8/2013 | Fillingim et al. |

SYSTEM AND METHOD FOR PERFORMING SIMULTANEOUS READ AND WRITE OPERATIONS IN A MEMORY

CROSS-REFERENCE TO RELATED APPLICATIONS

This application is a continuation of U.S. patent application Ser. No. 14/964,219, now U.S. Pat. No. 9,766,978, entitled, "System and Method for Performing Simultaneous Read and Write Operations in a Memory," filed on Dec. 9, 2015, which claims the benefit of U.S. Provisional Application No. 62/089,428 entitled "Write Routine During XOR Operations without Back Pressuring Non Writing Interfaces," filed on Dec. 9, 2014. The applications referenced above are hereby incorporated by reference herein in their entireties.

FIELD OF THE DISCLOSURE

The present disclosure relates generally to computer memories, and more particularly, to memory devices having multiple memory banks and storing parity information to support multiple simultaneous memory accesses.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional memory devices typically are configured so that during any given clock cycle only a single memory operation, such as a read operation, can be performed at a particular block of memory. Similarly, it may be impossible to perform various read operations in a particular memory block during a clock cycle in which a write operation is being performed at the same particular memory block. Moreover, because write operations may require several clock cycles to complete, performance of a read operation may also be delayed for several cycles in conventional memories. In the context of some networking or switching applications, various data that is used for packet processing, for example control tables, forwarding tables and the like, are shared among various switching devices or switching cores of a single device. At times, these multiple devices and cores need to perform read and write operations in a particular memory block during the same clock cycle.

However, limitations in conventional memory devices on the ability of the multiple devices and cores to speedily read data stored in a shared memory, or to write data to a shared memory, can result, for example, in a reduction of switching capabilities. Although each device can be provided with its own respective memory, such a solution is expensive both in terms of the direct cost of additional memory as well as in terms of resources required to keep the different memories synchronized.

SUMMARY

In an embodiment, a network device comprises: a set of content memory banks configured to store content data, the set of content memory banks including a first memory bank; a parity memory bank corresponding to the set of content memory banks configured to store parity information; a first memory interface; and a second memory interface. The first memory interface is configured to perform a write operation to write new content data to a location in a first content memory bank in a plurality of partial write operations that are spread over two or more clock cycles, the plurality of partial write operations including: reading old content data from the location in the first content memory bank during a first clock cycle, generating new parity information for the new content data using the old content data, and storing the new parity information to the parity memory bank in a second clock cycle after the first clock cycle. The second memory interface is configured to perform a read operation, independently of reading old content data of the plurality of partial write operations, at the location in the first content memory bank concurrently while the first memory interface is performing at least one of the plurality of partial write operations.

In another embodiment, a method of reading and writing data to a memory device of a network device includes performing, with a first memory interface device, a write operation in a plurality of partial write operations spread over multiple clock cycles to write new content data to a location in a first content memory bank among a set of multiple content memory banks, the plurality of partial write operations including: reading old content data from the location in the first content memory bank during a first clock cycle, generating new parity information using the old content data, and writing the new parity information to a location in a parity memory bank in a second clock cycle after the first clock cycle. The method also includes performing, with a second memory interface, a concurrent read operation, independently of reading old content data of the two or more partial write operations, at the location in the first content memory bank while the first memory interface is performing at least one of the plurality of partial write operations.

DETAILED DESCRIPTION

Various embodiments of memory devices are described below. In some embodiments, the memory devices described herein utilize techniques described in U.S. Pat. No. 8,514,651, entitled "Sharing Access to a Memory Among Clients," which is hereby incorporated by reference herein in its entirety.

Figure 1:
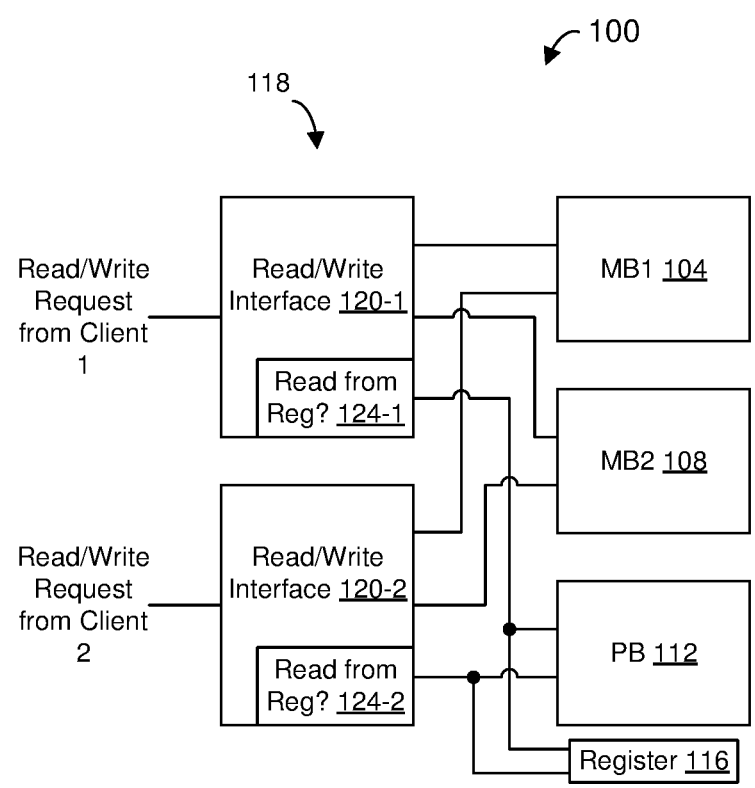
FIG. 1 is a block diagram of an example memory device, according to an embodiment.

FIG. 1 is a block diagram of an example memory device 100, according to an embodiment. The memory device 100 includes a set of memory banks 104, 108 to store content data (sometimes referred to herein as "content memory banks"). The memory device 100 also includes a memory bank 112 to store redundancy information (sometimes referred to herein as a "parity memory bank") that is suitable for use by error correction algorithms. In an embodiment, the memory banks 104, 108, and 112 are single port memories. One of the advantages of the memory device 100, as compared with a larger single port memory, is that throughput is increased because data in more than one location in either of the content memory banks 104, 108 can be read in a single clock cycle—i) one location in one of the memories 104, 108 is read directly, ii) while content information at a different location in the one of the memories 104, 108 is reconstructed using content information read from the other of the memories 104, 108, and redundancy information read from the parity memory bank 112.

In some embodiments, each memory bank 104, 108, 112 is structured as an array of rows. Rows of the memory bank 104, 108, 112 have respective addresses, where respective rows of memory bank (MB1) 104 correspond with respective rows of memory bank (MB2) 108 and with respective rows of memory bank (PB) 112. For example, row 1 of MB1 corresponds with row 1 of MB2 and row 1 of PB; row 2 of MB1 corresponds with row 2 of MB2 and row 2 of PB; etc.

In an embodiment, parity data (sometimes referred to herein as "redundancy data") in each row of PB 112 is calculated with content data in the corresponding row of MB1 and in the corresponding row of MB2. More generally, in an embodiment, parity data in an i-th row of PB 112 is calculated with content data in an i-th row of MB1 and in an i-th row of MB2, where i is an integer index. Thus, for example, if read access to MB1 is blocked in a particular clock cycle because MB1 is busy performing some other memory operation, content data from the i-th row of MB1 can effectively be read during that clock cycle by instead reading content data from the i-th row of MB2 and parity data from the i-th row of PB 112, and then reconstructing the content data from the i-th row of MB1 using the content data from the i-th row of MB2 and parity data from the i-th row of PB 112. In contrast, with a conventional single port memory, reading from a first row would block a parallel read operation from reading any row of the same memory. However, with the memory device 100, if two simultaneously received read requests (first read request and second read request) are for the same one of MB1, MB2, the first read request is granted access to the one of MB1, MB2, and the second read request is serviced by reconstructing the requested content data using data from a corresponding row from the other one of MB1, MB2, and parity data from a corresponding row of PB 112.

The parity data in PB 112 is calculated using a suitable error correction code (ECC) such that content data in one of MB1 104 or MP2 108 can be reconstructed using i) content data in the other one of MB1 104 or MP2 108, and ii) parity data in PB 112, in some embodiments. For instance, in an embodiment, parity data in the i-th row of PB 112 is calculated by exclusive OR-ing (XORing) content data in the i-th row of MB1 with content data in the i-th row of MB2. Thus, in an embodiment, content data in the i-th row of one of MB1 104 or MP2 108 can be reconstructed by XORing i) content data in the i-th row of the other one of MB1 104 or MP2 108, with ii) parity data in the i-th row of PB 112.

In prior memory devices having multiple content memory banks and a parity memory bank, a write operation would delay the servicing of all read requests because content in the memory device could not be considered valid until both i) new content data was written to one of the content memory banks, and ii) new parity data (corresponding to the new content data) was written to the parity memory bank. Moreover, in prior memory devices the servicing of read requests to other memory locations in the memory bank being written to would also be delayed until completion of the write operation. In various embodiments described below, however, techniques for writing to a memory device, such as the memory device 100, permit read requests to be serviced even before a write operation is completed.

The memory device 100 also includes one or more registers 116 associated with PB 112. As will be described in more detail below, the one or more registers 116 (sometimes referred to herein as "the register 116" for brevity) are utilized to store parity information prior to the parity information being stored in PB 112. In some embodiments, a write operation to write new content data to one of MB1 and MB2 occurs over several clock cycles, and includes temporarily storing new parity data to the register 116 and later transferring the new parity information from the register 116 to PB 112 to complete the write operation. As will be explained below, such a write operation enables resumption of servicing of read requests more quickly (as compared to prior devices) because the write operation can be performed with only one of multiple read/write interfaces of the memory device 100, thus keeping the other read/write interface(s) of the memory device 100 available for servicing read requests.

A memory interface device 118 includes a plurality of read/write interface devices 120 that handle simultaneous read and write requests from a plurality of clients. For instance, read/write interface device 120-1 handles read and write requests from a first client (client 1), and read/write interface device 120-2 handles read and write requests from a second client (client 2). Each read/write interface device 120 is coupled to MB1 104, MB2 108, PB 112, and the register 116, and each read/write interface device 120 can selectively read from and write to MB1 104, MB2 108, PB 112, and the register 116. In an embodiment, the read/write interface devices 120, MB1 104, MB2 108, PB 112, and the register 116 utilize a clock signal (not shown in FIG. 1), and in an embodiment the memory device 100 supports two simultaneous read operations during a single cycle of the clock signal. In an embodiment, the memory device 100 includes an arbitrator circuit (not shown) that decides which of the read/write interface device 120-1 or the read/write interface device 120-2 gets direct access to a particular memory bank (e.g., MB1 104, MB2 108) during a particular clock cycle when both of the read/write interface device 120-1 or the read/write interface device 120-2 are attempting to access the same memory bank.

As briefly discussed above, in some embodiments, new parity information corresponding to content newly written to a content memory bank is initially stored in the register 116 prior to the parity information being stored in PB 112. Accordingly, each read/write interface device 120 includes a circuit 124 configured to determine whether the read/write interface device 120 is to read parity data from PB 112, or whether the read/write interface device 120 should instead read the parity data from the register 116.

When the read/write interface device 120-1 receives a read request corresponding to an addressable location in MB1 104, and if the read/write interface device 120-1 is able to gain access to MB1 104, then the read/write interface device 120-1 services the read request by reading from the corresponding location in MB1 104. Similarly, when the read/write interface device 120-1 receives a read request corresponding to an addressable location in MB2 108, and if the read/write interface device 120-1 is able to gain access to MB2 108, then the read/write interface device 120-1 services the read request by reading from the corresponding location in MB2 108. In some embodiments, the read/write interface device 120-2 is configured to operate in a similar manner.

On the other hand, when the read/write interface device 120-1 receives a read request corresponding to an addressable location in MB1 104, and if read/write interface device 120-1 is not able to gain access to MB1 104, then read/write interface device 120-1 services the read request by instead reading content information from a corresponding addressable location in MB2 108 and parity information from a corresponding addressable location in PB 112, and then reconstructs the information in the particular memory location in MB1 104, for example, by XORing the content information retrieved from the corresponding location in MB2 108 with the parity information retrieved from the corresponding addressable location in PB 112. Similarly, when the read/write interface device 120-1 receives a read request corresponding to an addressable location in MB2 108, and if read/write interface device 120-1 is not able to gain access to MB2 108, then the read/write interface device 120-1 services the read request by instead reading content information from a corresponding addressable location in MB1 104 and parity information from a corresponding addressable location in PB 112, and then reconstructs the information in the particular memory location in MB2 108 by XORing the content information retrieved from the corresponding location in MB1 104 with the parity information retrieved from the corresponding location in PB 112. In some embodiments, the read/write interface device 120-2 is configured to service read requests in a similar manner, for example, using other suitable error correction algorithms that utilize partial data in conjunction with parity data.

In some embodiments, the read/write interface device 120-1 is configured to perform a write operation (including updating parity data) over several clock cycles in a manner, described in greater detail below, such that the other read/write interface device 120-2 is not blocked from performing read operations during the write operation of the read/write interface device 120-1. Similarly, in some embodiments, the read/write interface device 120-2 is similarly configured to perform a write operation (including updating parity data) over several clock cycles such that the other read/write interface device 120-1 is not blocked from performing read operations during the write operation of the read/write interface device 120-2. This is particularly notable because with some prior memory devices, in various embodiments, all read requests (or at least some) effectively are blocked from being handled while a write operation is being performed. For instance, with some prior memory devices, in various embodiments, a write operation utilizes multiple read/write interfaces, thus effectively preventing those multiple read/write interfaces from handling any read requests until the write operation is completed.

For instance, in prior art devices having a structure similar the memory device 100 of FIG. 1, in various embodiments, both read/write interfaces 120 would be enlisted during a write operation to write new content to one of the content memory banks MB1, MB2 and to update parity data in PB 112. For instance, writing new content to one of the memory banks MB1, MB2 also entails, in an embodiment, updating parity data in PB 112 to reflect the new content data, and updating the parity data in PB 112 entails, in an embodiment, using i) old content data in the one of MB1, MB2 and ii) old parity data in PB 112 to calculate the new parity data. Thus, a prior art device having a structure similar the memory device 100 of FIG. 1, for example, used the read/write interface device 120-1 to read old content data from MB1 in a first clock cycle, and used the read/write interface device 120-2 to read old parity data (corresponding to the old content data) from PB 112 also in the first clock cycle. The new content data, the old content data from MB1, and the old parity data from PB 112 were then used to calculate the new parity data. In a second clock cycle, the read/write interface device 120-1 was used to write the new content data to MB1, and the read/write interface device 120-2 was used to write the new parity data to PB 112. Thus, in such a prior art device, no read requests could be serviced in either of the first clock cycle or the second clock cycle because both of the read/write interface devices 120 were busy performing tasks as part of the write operation to write new content data to MB1 and to update parity data in PB 112.

Figure 2:
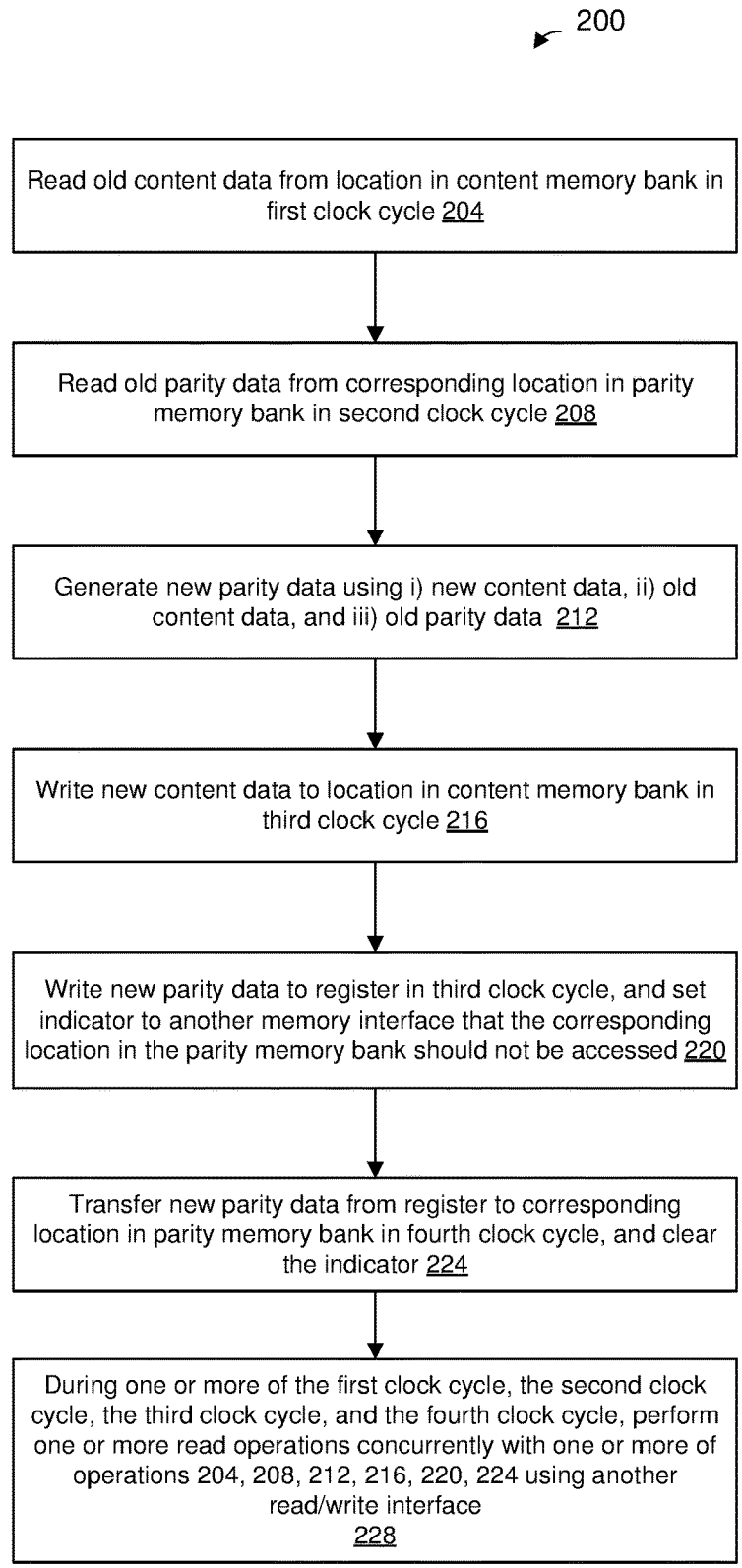
FIG. 2 is a flow diagram of an example method of writing data to the memory device of FIG. 1, according to an embodiment.

FIG. 2 is a flow diagram of an example method 200 of performing, over multiple clock cycles, a write operation with a memory device having multiple memory banks concurrently with performing one or more read operations with the memory device, according to an embodiment. In an embodiment, write operations included in the method 200 can be implemented by a single read/write interface device, thus keeping another read/write interface available for handling read requests concurrent with the performance of the write operation. Each read/write interface device 120 is configured to implement the write operations in method 200, according to some embodiments, and the method 200 is described with reference to FIG. 1 for explanatory purposes. In other embodiments, however, the method 200 is implemented by another suitable memory device having multiple memory banks. Similarly, in some embodiments, each read/write interface device 120 is configured to implement another suitable method for performing a write operation with a memory device having multiple memory banks. In an embodiment, the memory devices are single port memories that respectively have multiple addresses and support performing only a single memory operation, for example a read or write operation, in any given clock cycle.

The method 200 is described, merely for explanatory purposes, in the context of the read/write interface 120-1 performing a write operation to write content data to a particular location in MB1 104 (e.g., a particular row of MB1 104 having an associated address). In other scenarios, a similar technique is utilized to perform a write operation to write content data to a particular location in MB2 108. Similarly, in other scenarios, the read/write interface 120-2 performs a similar write operation to write content data to a particular location in MB1 104 or MB2 108.

The method 200 includes writing new content data MB1 104. Because new content data is being written to MB1 104, however, corresponding new parity data also must be calculated and then stored to PB 112, in an embodiment. The new parity data is calculated, in an embodiment, using i) the new content data, ii) old content data in MB1 104 at a location that will be overwritten by the new content data, and iii) old parity data in PB 112 at a location that will be overwritten by the new parity data.

At operation 204, the old content data is read, in a first clock cycle, from a location in a first content memory bank at which new content data is to be written, in an embodiment. For example, in an embodiment, the read/write interface 120-1 reads old content data, in the first clock cycle, from an addressable location in MB1 104 at which new content data is to be written.

At operation 208, the old parity data is read, in a second clock cycle, from a location in a parity memory bank corresponding to the location in the first memory bank at which the new content data is to be written. For example, in an embodiment, the read/write interface 120-1 reads old parity data, in the second clock cycle, from a location in PB 112 that corresponds to the location in MB1 104 at which the new content data is to be written.

At operation 212, the new parity data is generated using i) the new content data, ii) the old content data read at operation 204, and iii) the old parity data read at operation 208. For example, in an embodiment, the read/write interface 120-1 generates the new parity data by XORing together i) the new content data to be written to MB1 104, ii) the old content data read from MB1 104 at operation 204, and iii) the old parity data read from PB 112 at operation 208.

At operation 216, the new content data is written, in a third clock cycle, to the location in the first content memory bank. For example, in an embodiment, the read/write interface 120-1 writes the new content data, in the third clock cycle, to the location in MB1 104.

At operation 220, also during the third clock cycle, the new parity data is written to a register associated with the parity memory bank, in an embodiment. For example, the read/write interface 120-1 writes the new parity data, in the third clock cycle, to the register 116. Also, an indicator to another memory interface that the corresponding location in the parity memory bank should not be accessed is set. For example, in an embodiment, the read/write interface 120-1 sets the indicator. In various embodiments, the indicator includes an address of the corresponding location in the parity memory bank, a row number corresponding to the location in the parity memory bank, an identifier of a the corresponding element in a memory array of the parity memory bank, etc. In some embodiments, the indicator is included in the register 116. For example, in an embodiment, a first part of the register 116 is used to store the indicator, and a second part of the register 116 is used to store the new parity data. In another embodiment, a first register associated with the parity memory bank is used to store the indicator, and a second register associated with the parity memory bank is used to store the new parity data.

After operation 220 is completed, the new content data in MB1 104 can be reconstructed by the read/write interface 120-2 even though the entire write procedure has not been completed, e.g., because the parity data in PB 112 is not yet updated. For example, if the read/write interface 120-2 is blocked from accessing MB1 104 because the write procedure is not yet completed, the new parity data in the register 116 is available to the read/write interface 120-2 for the read/write interface 120-2 to reconstruct the new content data now in MB1 104.

At operation 224, the new parity data is transferred, during a fourth clock cycle, from the register associated with the parity memory bank to the corresponding location in the parity memory bank. For example, in an embodiment, the read/write interface 120-1 transfers the new parity data, in the fourth clock cycle, from the register 116 to the corresponding location in PB 112. Also, the indicator set at block 220 is cleared. For example, in an embodiment, the read/write interface 120-1 clears the indicator. In embodiments in which the indicator includes an address of the corresponding location in the parity memory bank, a row number corresponding to the location in the parity memory bank, an identifier of the corresponding element in a memory array of the parity memory bank, etc., block 224 includes setting the address, row number, element identifier, etc., to a predetermined value such as zero or some other suitable value to inform another memory interface device that the indicator is not set.

In an embodiment, while the read/write interface 120-1 performs the method 200 (e.g., during the first clock cycle through the fourth clock cycle), the read/write interface 120-1 is not available to handle other read/write requests. The read/write interface 120-2, however, remains available for handling read/write requests while the read/write interface 120-1 is tied up performing the method 200. Thus, in an embodiment, the method 200 permits one read/write interface 120 to remain available for handling read/write requests while the other read/write interface 120 is tied up handling the write operation.

Thus, the method 200 includes operation 228, which comprises performing one or more read operations with the read/write interface 120-2 concurrently with the read/write interface 120-1 performing one or more of operations 204, 208, 212, 216, 220, 224. For example, in an embodiment, the read/write interface 120-2 can service a read request during the first clock cycle (operation 204). If the read request is for reading content from MB1 104, MB1 104 is blocked during the first clock cycle (because the read/write interface 120-1 is reading from MB1 104), but the read/write interface 120-2 can service the read request by reconstructing the requested content data in MB1 104 using content data in MB2 108 and parity data in PB 112.

As another example, in an embodiment, during the second clock cycle (operation 208) neither MB1 104 nor MB2 108 is blocked, and thus the read/write interface 120-2 can service a read request for either MB1 104 or MB2 108.

As yet another example, in an embodiment, the read/write interface 120-2 can service a read request during the third clock cycle (operation 216). If the read request is for reading content from MB1 104, MB1 104 is blocked during the third clock cycle (because the read/write interface 120-1 is writing new content data to MB1 104), but the read/write interface 120-2 can service the read request by reconstructing the requested content data in MB1 104 using content data in MB2 108 and parity data in PB 112.

As a further example, in an embodiment, the read/write interface 120-2 can service a read request during the fourth clock cycle (operation 224). If the read request is for reading content from the location in MB1 104 at which the new content data was written at operation 216, MB1 104 is blocked during the fourth clock cycle (e.g., because the read/write interface 120-1 is still completing the write operation), but the read/write interface 120-2 can service the read request by reconstructing the requested content data in MB1 104 using content data in MB2 108 and parity data stored in the register 116. The read/write interface 120-2 knows to use parity data in 116 rather than parity data in PB 112 itself because of the indicator set during operation 220.

With a memory device configured to perform a write operation described with reference to FIG. 2, for example, current parity information is sometimes stored in the register 116 rather than in the PB 112, in some embodiments. Thus, when performing a read operation that requires reconstructing content data using parity data (e.g., because a memory bank cannot be directly accessed due to handling of a simultaneous memory operation), it should first be determined from where the parity information is to be obtained, e.g., from PB 112 or the register 116, in some embodiments.

Figure 3:
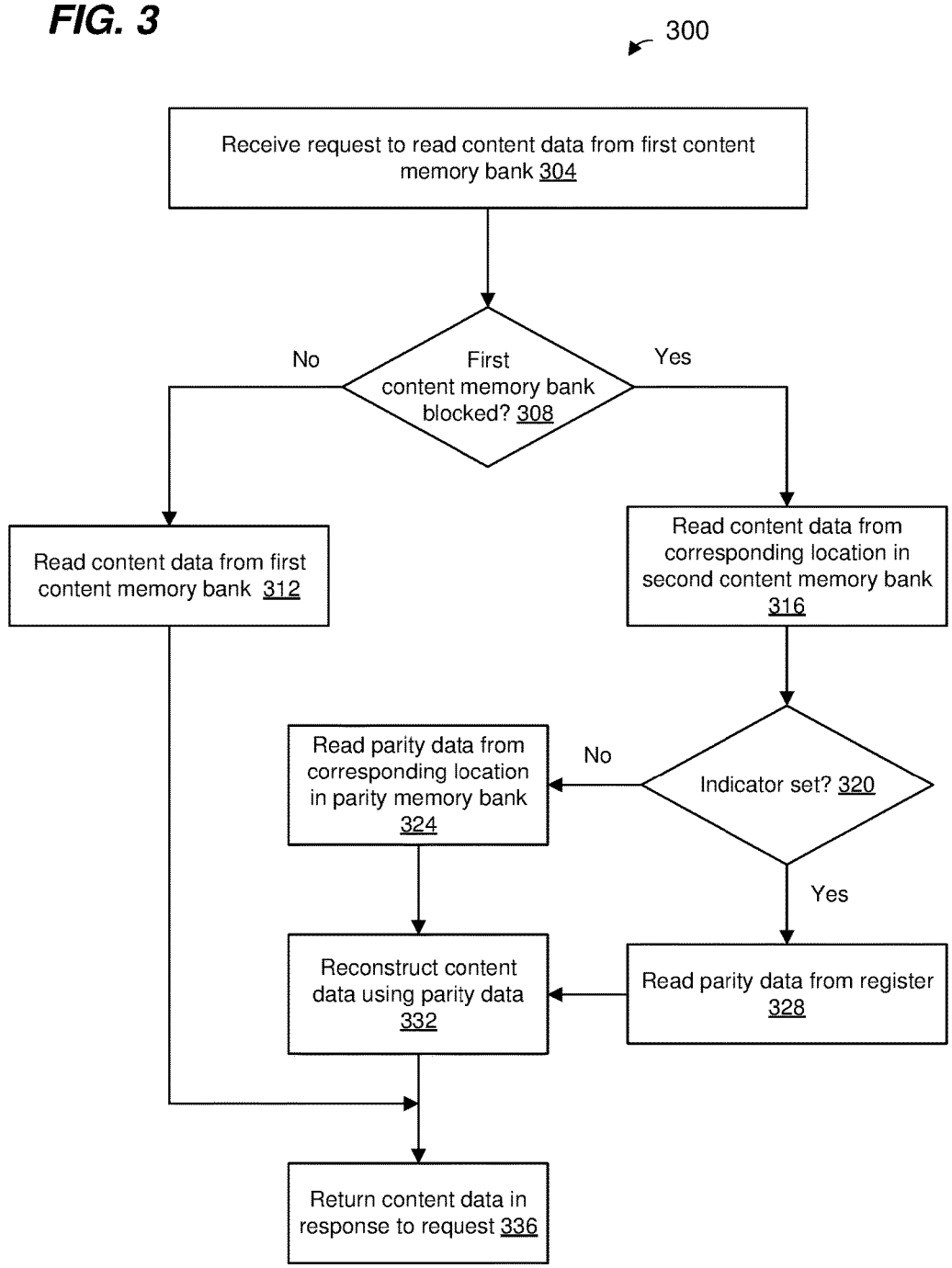
FIG. 3 is a flow diagram of an example method of reading data from the memory device of FIG. 1, according to an embodiment.

FIG. 3 is a flow diagram of an example method 300 of performing a read operation with a memory device having multiple memory banks and a register for temporarily storing parity data for reconstructing content data, according to an embodiment. Each read/write interface device 120 is configured to implement the method 300, according to some embodiments, and the method 300 is described with reference to FIG. 1 for explanatory purposes. In other embodiments, however, the method 300 is implemented by another suitable memory device having multiple memory banks. Similarly, in some embodiments, each read/write interface device 120 is configured to implement another suitable method for performing a read operation with a memory device having multiple memory banks.

The method 300 is described, merely for explanatory purposes, in the context of the read/write interface 120-2 performing a read operation to read content data from a particular location in MB1 104. In other scenarios, a similar technique is utilized to perform a read operation to read content data from a particular location in MB2 108. Similarly, in other scenarios, the read/write interface 120-1 performs a similar read operation to read content data from a particular location in MB1 104 or MB2 108.

The method 300 can be implemented by the read/write interface 120-2 transparent to whether or not the read/write interface 120-1 is concurrently performing a write operation, in an embodiment. Thus, the method 300 can be performed by the read/write interface 120-2 concurrently with the read/write interface 120-1 performing one or more of operations 204, 208, 212, 216, 220, 224, in an embodiment.

At block 304, a request to read content data at a location in a first content memory bank is received. For example, in an embodiment, the read/write interface 120-1 receives a request to read content data at a location in MB1 104.

At block 308, it is determined whether the first content memory is blocked, for example because an address therein is being read or written to by another read/write interface device (e.g., read/write interface device 120-1). For example, in an embodiment, the read/write interface device 120-2 may be blocked from accessing MB1 104 while the read/write interface device 120-1 is performing a write operation (e.g., during one or more of the first clock cycle, the second clock cycle, the third clock cycle, and/or the fourth clock cycle discussed with reference to FIG. 2). In an embodiment, a flag is set to indicate that the first content memory is blocked from being accessed by the read/write interface 120-1. As discussed above, the memory device 100 includes an arbitrator circuit, in an embodiment, and the arbitrator circuit is configured to set the flag when the arbitrator circuit grants access to MB1 104 to another read/write interface 120, e.g., the read/write interface 120-2.

If it is determined at block 308 that the first content memory is not blocked, the flow proceeds to block 312, at which content data at the location in the first content memory bank is read. For example, in an embodiment, the read/write interface 120-1 reads content data from the location in MB1 104.

On the other hand, if it is determined at block 308 that the first content memory is blocked, for example because an address therein is being read or written to, the flow proceeds to block 316, at which content data at a corresponding location in a second memory bank is read. For example, in an embodiment, the read/write interface 120-2 reads content data from a corresponding location in MB2 108.

At block 320, it is determined whether an indicator that a corresponding location in a parity memory bank should not be accessed (e.g., because the parity information at that location is out-of-date) is set. For example, in an embodiment such as described above with reference to FIG. 2, another memory interface device (e.g., the read/write interface device 120-1) may set the indicator when the other memory interface device has stored new parity information in a register (e.g., the register 116) but has not yet transferred the new parity information to the location in the parity memory bank. In an embodiment, the circuit 124-2 of the read/write interface device 120-2 determines whether the indicator is set. In an embodiment, the indicator is stored in a first part of the register 116, and the circuit 124-2 analyzes the first part of the register 116 to determine whether the indicator is set. In another embodiment, the indicator is stored in another register separate from the register 116, and the circuit 124-2 analyzes the other register to determine whether the indicator is set. In an embodiment, the indicator includes an address of a corresponding element in the parity memory bank that should not be accessed (e.g., because the location has out-of-data information), and the circuit 124-2 compares the address of the indicator to the corresponding address of the location in the parity memory bank 112 that the read/write interface device 120-2 is attempting to access.

Referring now to FIG. 1, in some embodiments, each circuit 124 includes a respective comparator circuit configured to compare i) an address, a row number, a memory element identifier, etc., corresponding to an element (e.g., a row) in PB 112 that is to be accessed with ii) an address, row number, memory element identifier, etc., included in or associated with the indicator that a corresponding location in PB 112 should not be accessed (e.g., because the parity information at that location is out-of-date).

Referring again to FIG. 3, if it is determined at block 320 that the indicator is not set, the flow proceeds to block 324, at which parity data at the corresponding location in the parity memory bank is read. For example, in an embodiment, the read/write interface 120-2 reads parity data from the corresponding location in PB 112.

On the other hand, if it is determined at block 320 that the indictor is set, the flow proceeds to block 328, at which parity data from a register associated with the parity memory bank is read. For example, in an embodiment, the read/write interface 120-2 reads parity data from the register 116.

At block 332, the requested content data is reconstructed using the content data retrieved from the second content memory bank at block 316 and either the parity data retrieved from the parity memory bank at block 324 or the parity data retrieved from the register at block 328. For example, in an embodiment, the read/write interface 120-2 reconstructs the requested content data in MB1 104 by XORing the content data retrieved from MB2 108 with either the parity data retrieved from PB 112 or the parity data retrieved from the register 116.

At block 336, the request received at block 304 is responded to with the requested content memory data from the first content memory, which was either retrieved from the first content memory or reconstructed using parity data. In an embodiment, the read/write interface 120-2 responds to the read request with content data either retrieved from MB1 104 at block 312 or reconstructed using parity data at block 332.

In some embodiments, a memory device that utilizes reading/writing procedures such as discussed above includes more than two content memory banks. In some embodiments, a memory device that utilizes reading/writing procedures such as discussed above includes more than one parity memory bank. In some embodiments, a memory device that utilizes reading/writing procedures such as discussed above is configured to handle more than two concurrent memory operations.

Figure 4:
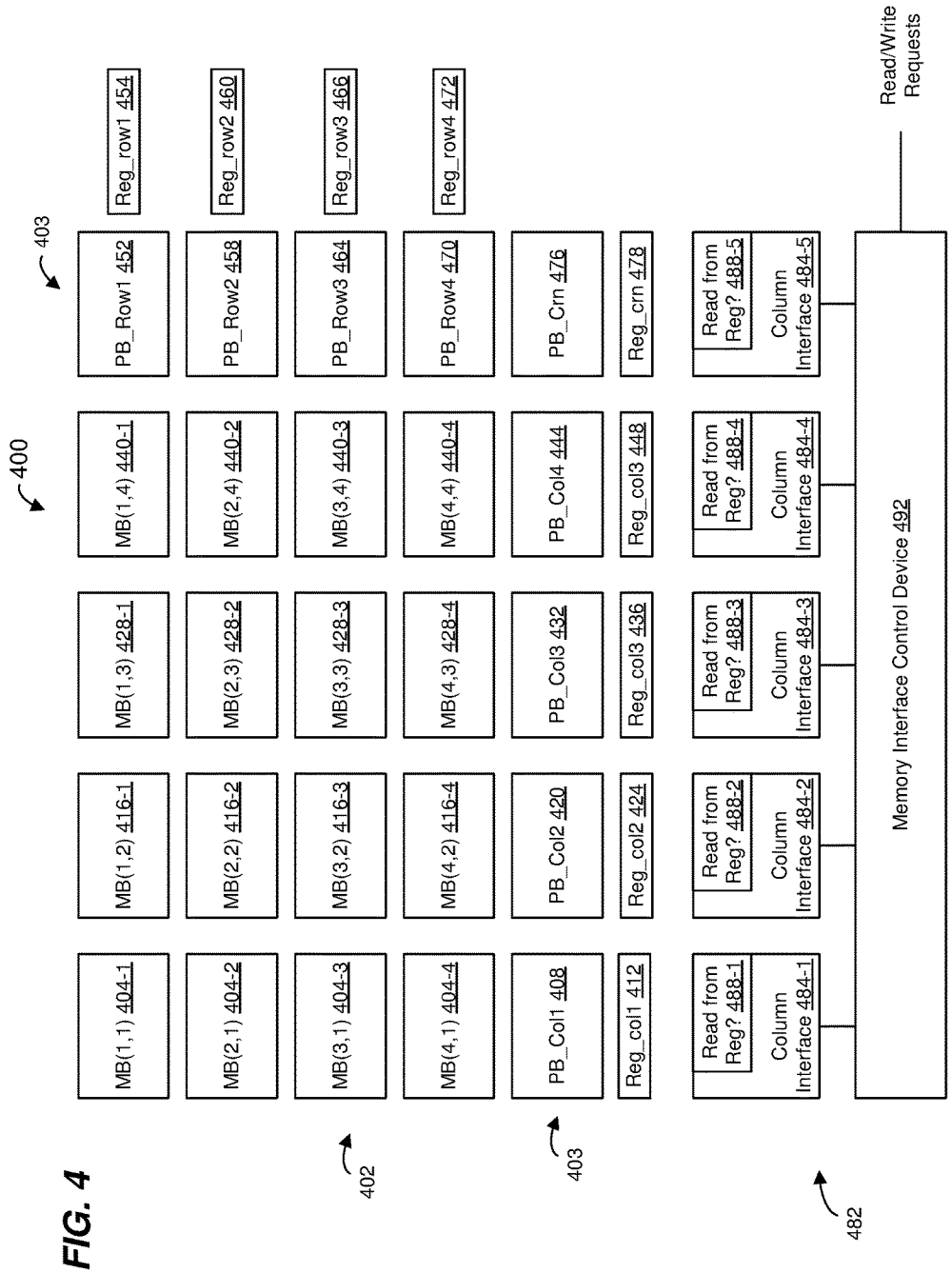
FIG. 4 is a block diagram of another example memory device, according to an embodiment.

FIG. 4 is a block diagram of another example memory device 400 configured as a two-dimensional array of memory banks, according to an embodiment. For ease of explanation, a first dimension of the array is referred to in the description below as "columns" and a second dimension of the array is referred to as "rows". Use of the terms "row", "rows", "column", and "columns" is not meant to connote a particular spatial orientation of the memory device 400, but merely is for ease in distinguishing between the first dimension and the second dimension in the description below.

The memory device 400 includes a two dimensional array of memory banks 402 to store content data (sometimes referred to herein as "content memory banks"). The memory device 400 also includes a plurality of memory banks 403 to store parity information (sometimes referred to herein as a "parity memory banks"). A first column of content memory banks 404 (sometimes referred to as "MB(i,1)", for i=1, 2, 3, or 4) is associated with a corresponding parity memory bank 408 (sometimes referred to as "PB_Col1"). One or more registers 412 (sometimes referred to as "Reg_col1" or "the register 412" for brevity) are associated with the parity memory bank 408. A second column of content memory banks 416 (sometimes referred to as "MB(i,2)", for i=1, 2, 3, or 4) is associated with a corresponding parity memory bank 420 (sometimes referred to as "PB_Col2"). One or more registers 424 (sometimes referred to as "Reg_col2" or "the register 424" for brevity) are associated with the parity memory bank 420. A third column of content memory banks 428 (sometimes referred to as "MB(i,3)", for i=1, 2, 3, or 4) is associated with a corresponding parity memory bank 432 (sometimes referred to as "PB_Col3"). One or more registers 436 (sometimes referred to as "Reg_col3" or "the register 436" for brevity) are associated with the parity memory bank 432. A fourth column of content memory banks 440 (sometimes referred to as "MB(i,1)", for i=1, 2, 3, or 4) is associated with a corresponding parity memory bank 444 (sometimes referred to as "PB_Col4"). One or more registers 448 (sometimes referred to as "Reg_col4" or "the register 448" for brevity) are associated with the parity memory bank 444. In an embodiment, the memory banks 402 are each configured as a single port memory bank supporting only a single memory access operation in a given clock cycle, but having a plurality of separately addressable memory locations. In other embodiments, memory banks are multiport memories configured to support two or more memory operations in a single clock cycle. In such multiport memories embodiments, content is reconstructed in a similar manner as described above with respect to single port memories using data from other memory banks and the parity memory bank when more memory operations than the number ports of a memory bank is to be performed in a given clock cycle.

A parity memory bank 452 (sometimes referred to as "PB_Row1") is associated with a first row of content memory banks comprising MB(1,1), MB(1,2), MB(1,3), and MB(1,4). One or more registers 454 (sometimes referred to as "Reg_row1" or "the register 454" for brevity) are associated with the parity memory bank 452. A parity memory bank 458 (sometimes referred to as "PB_Row2") is associated with a second row of content memory banks comprising MB(2,1), MB(2,2), MB(2,3), and MB(2,4). One or more registers 460 (sometimes referred to as "Reg_row2" or "the register 460" for brevity) are associated with the parity memory bank 458. A parity memory bank 464 (sometimes referred to as "PB_Row3") is associated with a third row of content memory banks comprising MB(3,1), MB(3,2), MB(3,3), and MB(3,4). One or more registers 466 (sometimes referred to as "Reg_row3" or "the register 466" for brevity) are associated with the parity memory bank 464. A parity memory bank 470 (sometimes referred to as "PB_Row4") is associated with a fourth row of content memory banks comprising MB(4,1), MB(4,2), MB(4,3), and MB(4,4). One or more registers 472 (sometimes referred to as "Reg_row4" or "the register 472" for brevity) are associated with the parity memory bank 470.

A parity memory bank 476 (sometimes referred to as "PB_Crn", or "the corner parity memory bank 476") is associated with a column of parity memory banks comprising PB_Row1, PB_Row2, PB_Row3, and PB_Row4. One or more registers 478 (sometimes referred to as "Reg_crn" or "the register 478" for brevity) are associated with the parity memory bank 476.

In some embodiments, each memory bank (MB) illustrated in FIG. 4 is structured as a single port memory array, in an embodiment, where respective elements of the memory array correspond with i) respective elements of the other memory arrays in the same column, ii) respective elements of the parity memory array corresponding to the same column, iii) respective elements of the other memory arrays in the same row, and iv) respective elements of the parity memory array corresponding to the same row. For example, respective elements MB(1,1) correspond with i) respective elements of the other memory arrays in the same column (e.g., MB(2,1), MB(3,1), and MB(4,1)), ii) respective elements of the parity memory bank PB_Col1, iii) respective elements of the other memory arrays in the same row (e.g., MB(1,2), MB(1,3), and MB(1,4)), and iv) respective elements of the parity memory bank PB_Row1.

In an embodiment, parity data in each array element of PB_Col1 is calculated with content data in the corresponding array elements of MB(1,1), MB(2,1), MB(3,1), and MB(4,1). In other words, in an embodiment, parity data in an i-th array element of PB_Col1 is calculated with content data in an i-th array elements of MB(1,1), MB(2,1), MB(3,1), and MB(4,1), where i is an integer index.

The parity data in PB_Col1 is calculated using a suitable ECC such that content data in one of MB(1,1), MB(2,1), MB(3,1), and MB(4,1) can be reconstructed using i) content data in the other ones of MB(1,1), MB(2,1), MB(3,1), and MB(4,1), and ii) parity data in PB_Col1, in some embodiments. For instance, in an embodiment, parity data in the i-th array element of PB_Col1 is calculated by XORing together content data in the i-th array elements of MB(1,1), MB(2,1), MB(3,1), and MB(4,1). Thus, in an embodiment, content data in the i-th element of one of MB(1,1), MB(2,1), MB(3,1), and MB(4,1) can be reconstructed by XORing i) content data in the i-th elements of the other ones of MB(1,1), MB(2,1), MB(3,1), and MB(4,1), with ii) parity data in the i-th element of PB_Col1.

In other embodiments, other suitable ECCs are utilized (e.g., such as Reed-Solomon).

In a similar manner, the parity data in PB_Col2 is calculated using a suitable ECC such that content data in one of MB(1,2), MB(2,2), MB(3,2), and MB(4,2) can be reconstructed using i) content data in the other ones of MB(1,2), MB(2,2), MB(3,2), and MB(4,2), and ii) parity data in PB_Col2, in some embodiments. The parity data in PB_Col3 is calculated using a suitable ECC such that content data in one of MB(1,3), MB(2,3), MB(3,3), and MB(4,3) can be reconstructed using i) content data in the other ones of MB(1,3), MB(2,3), MB(3,3), and MB(4,3), and ii) parity data in PB_Col3, in some embodiments. The parity data in PB_Col4 is calculated using a suitable ECC such that content data in one of MB(1,4), MB(2,4), MB(3,4), and MB(4,4) can be reconstructed using i) content data in the other ones of MB(1,4), MB(2,4), MB(3,4), and MB(4,4), and ii) parity data in PB_Col4, in some embodiments.

In a similar manner, the parity data in PB_Row1 is calculated using a suitable ECC such that content data in one of MB(1,2), MB(1,2), MB(1,3), and MB(1,4) can be reconstructed using i) content data in the other ones of MB(1,2), MB(1,2), MB(1,3), and MB(1,4), and ii) parity data in PB_Row1, in some embodiments. The parity data in PB_Row2 is calculated using a suitable ECC such that content data in one of MB(1,2), MB(2,2), MB(2,3), and MB(2,4) can be reconstructed using i) content data in the other ones of MB(1,2), MB(2,2), MB(2,3), and MB(2,4), and ii) parity data in PB_Row2, in some embodiments. The parity data in PB_Row3 is calculated using a suitable ECC such that content data in one of MB(3,1), MB(3,2), MB(3,3), and MB(3,4) can be reconstructed using i) content data in the other ones of MB(3,1), MB(3,2), MB(3,3), and MB(3,4), and ii) parity data in PB_Row3, in some embodiments. The parity data in PB_Row4 is calculated using a suitable ECC such that content data in one of MB(4,1), MB(4,2), MB(4,3), and MB(4,4) can be reconstructed using i) content data in the other ones of MB(4,1), MB(4,2), MB(4,3), and MB(4,4), and ii) parity data in PB_Row4, in some embodiments.

In a similar manner, the parity data in PB_Crn is calculated using a suitable ECC such that data in one of PB_Row1, PB_Row2, PB_Row3, and PB_Row4 can be reconstructed using i) data in the other ones of PB_Row1, PB_Row2, PB_Row3, and PB_Row4, and ii) parity data in PB_Crn, in some embodiments.

Using techniques such as described above, four requests to access content data from MB(1,1), for example, can be simultaneously serviced. As an illustrative example, while a first request to read content data from MB(1,1) is serviced by physical access to MB(1,1), a second request to read content data from MB(1,1) is simultaneously serviced by accessing corresponding data from MB(2,1), MB(3,1), MB(4,1), and PB_Col1, and then reconstructing the requested content data from MB(1,1) with an ECC decoding procedure and the corresponding data from MB(2,1), MB(3,1), MB(4,1), and PB_Col1. Additionally, a third request to read content data from MB(1,1) is simultaneously serviced by accessing corresponding data from MB(1,2), MB(1,3), MB(1,4), and PB_Row1, and then reconstructing the requested content data from MB(1,1) with an ECC decoding procedure and the corresponding data from MB(1,2), MB(1,3), MB(1,4), and PB_Row1. Also, a fourth request to read content data from MB(1,1) is simultaneously serviced by reconstructing corresponding data from MB(1,2), MB(1,3), MB(1,4), and PB_Row1, and then reconstructing the requested content data from MB(1,1) with an ECC decoding procedure and the corresponding reconstructed data from MB(1,2), MB(1,3), MB(1,4), and PB_Row1. The corresponding data from MB(1,2) is reconstructed by accessing corresponding data from MB(2,2), MB(3,2), MB(4,2), and PB_Col2, and then reconstructing the content data from MB(1,2) with an ECC decoding procedure and the corresponding data from MB(2,2), MB(3,2), MB(4,2), and PB_Col2. The corresponding data from MB(1,3) is reconstructed by accessing corresponding data from MB(2,3), MB(3,3), MB(4,3), and PB_Col3, and then reconstructing the content data from MB(1,3) with an ECC decoding procedure and the corresponding data from MB(2,3), MB(3,3), MB(4,3), and PB_Col3. The corresponding data from MB(1,4) is reconstructed by accessing corresponding data from MB(2,4), MB(3,4), MB(4,4), and PB_Col4, and then reconstructing the content data from MB(1,4) with an ECC decoding procedure and the corresponding data from MB(2,4), MB(3,4), MB(4,4), and PB_Col4. The corresponding data from PB_Row1 is reconstructed by accessing corresponding data from PB_Row2, PB_Row3, PB_Row4, and PB_Crn, and then reconstructing the data from PB_Row1 with an ECC decoding procedure and the corresponding data from PB_Row2, PB_Row3, PB_Row4, and PB_Crn.

A read/write interface device 482 handles simultaneous read and write requests from a plurality of clients (e.g., client 1, client 2, client 3, and client 4), not shown in FIG. 4. The read/write interface device 482 includes a plurality of column interface devices 484, each of which is configured to handle read and write operations associated with a corresponding column of memory banks. In particular, the column interface device 484-1 is configured to handle read and write operations associated with MB(1,1), MB(2,1), MB(3,1), MB(4,1), and PB_Col1. The column interface device 484-2 is configured to handle read and write operations associated with MB(1,2), MB(2,2), MB(3,2), MB(4,2), and PB_Col2. The column interface device 484-3 is configured to handle read and write operations associated with MB(1,3), MB(2,3), MB(3,3), MB(4,3), and PB_Col3. The column interface device 484-4 is configured to handle read and write operations associated with MB(1,4), MB(2,4), MB(3,4), MB(4,4), and PB_Col4. The column interface device 484-5 is configured to handle read and write operations associated with PB_Row1, PB_Row2, PB_Row3, PB_Row4, and PB_Crn. Each column interface device 484 is coupled to memory banks of the corresponding column, the PB_Row1, PB_Row2, PB_Row3, PB_Row4, PB_Crn, and the registers of the parity memory banks to which the column interface device 484 is coupled.

As briefly discussed above, parity information is sometimes stored in the registers 412, 424, 436, 448, 454, 460, 466, 472, and 478 prior to the parity information being stored in PB_Col1, PB_Col2, PB_Col3, PB_Col4, PB_Row1, PB_Row2, PB_Row3, PB_Row4, and PB_Crn, respectively. Accordingly, each column interface device 484 includes a circuit 488 configured to determine whether, when the column interface device 484 is to read from one of the parity memory banks PB_Col1, PB_Col2, PB_Col3, PB_Col4, PB_Row1, PB_Row2, PB_Row3, PB_Row4, and PB_Crn, the interface device 484 should instead read from the associated register 412, 424, 436, 448, 454, 460, 466, 472, and 478.

The read/write interface device 482 also includes a memory interface control device 492. The memory interface control device 492 is configured to: i) receive read requests and write requests from clients, distribute read requests and write requests among the column interface devices 484, process results of read operations performed by the column interface devices 484, and respond to the read requests. Operation of the memory interface control device 492 is described in more detail below.

Operation of column interface device 484-1 will now be described as an illustrative example. The other column interface devices 484 are configured to operate in a similar manner.

When the column interface device 484-1 receives two read requests corresponding to different ones of MB(1,1), MB(2,1), MB(3,1), and MB(4,1), then the column interface device 484-1 services the two read request by reading from the different ones of MB(1,1), MB(2,1), MB(3,1), and MB(4,1).

On the other hand, when the column interface device 484-1 receives two read requests corresponding to the same one of MB(1,1), MB(2,1), MB(3,1), and MB(4,1), then column interface device 484-1 services a first read request by reading from the one of MB(1,1), MB(2,1), MB(3,1), and MB(4,1). The column interface device 484-1 services a second read request by reading content information from corresponding locations in the other ones of MB(1,1), MB(2,1), MB(3,1), and MB(4,1), and parity information from a corresponding location in PB_Col1. Then, the column interface device 484-1 reconstructs the information by XORing the content information retrieved from the corresponding locations in the other ones of MB(1,1), MB(2,1), MB(3,1), and MB(4,1), with the parity information from the corresponding location in PB_Col1, in an embodiment.

In some embodiments, the column interface device 484-1 is configured to perform a write operation over several clock cycles in a manner in which the column interface device 484-1 is not blocked from performing a second read operation during the write operation of the column interface device 484-1, nor are the other column interface devices 484 blocked from performing read operations during the write operation of the column interface device 484-1. In some embodiments, the column interface device 484-1 is configured to perform a write operation over several clock cycles in a manner in which the column interface device 484-1 is blocked from performing a second read operation during the write operation of the column interface device 484-1, but the other column interface devices 484 are not blocked from performing read operations during the write operation of the column interface device 484-1. This is particularly notable because with some prior memory devices, in various embodiments, all read requests (or at least some) effectively are blocked from being handled while a write operation is being performed. For instance, with some prior memory devices, in various embodiments, a write operation utilizes multiple read/write interfaces, thus effectively preventing those multiple read/write interfaces from handling any read requests until the write operation is completed.

For instance, in prior art devices having a structure similar the memory device 400 of FIG. 4, in various embodiments, all (or at least multiple ones of) column interfaces 484 would be enlisted during a write operation to write new content to one of the content memory banks MB, and to update parity data in one of the column parity memory banks 408, 420, 432, 444, in one of the row parity memory banks 452, 458, 464, 470, and the corner parity bank 476. For instance, writing new content to MB(3,1) also entails, in an embodiment, updating parity data in PB_Col1, in PB_Row3, and PB_Crn to reflect the new content data. Further, updating the parity data in PB_Col1, in PB_Row3, and PB_Crn entails, in an embodiment, using i) old content data in MB(3,1) and ii) old parity data in PB_Col1, in PB_Row3, and PB_Crn to calculate the new parity data. Thus, a prior art device having a structure similar to the memory device 100 of FIG. 1, for example, used column interface 484-1 to read old content data from MB(3,1) in a first clock cycle, and used column interface 484-5 to read old parity data (corresponding to the old content data) from PB_Row3 also in the first clock cycle. Also, the prior art device having the structure similar to the memory device 100 of FIG. 1, for example, used column interface 484-1 to read old parity data from PB_Col1 in a second clock cycle, and used column interface 484-5 to read old parity data (corresponding to the old content data) from PB_Crn also in the second clock cycle. The new content data, the old content data from MB(3,1), and the old parity data from PB_Col1, in PB_Row3, and PB_Crn were then used to calculate the new parity data. In a third clock cycle, the column interface 484-1 was used to write the new content data to MB1, and the column interface 484-5 was used to write new parity data to PB_Row3. In a fourth clock cycle, the column interface 484-1 was used to write the new parity data to PB_Col1, and the column interface 484-5 was used to write new parity data to PB_Crn. Thus, in such a prior art device, no read requests could be serviced by the column interface 484-1 and the column interface 484-5 in any of the first clock cycle, the second clock cycle, the third clock cycle, and the fourth clock cycle, because the column interface 484-1 and the column interface 484-5 were busy performing tasks as part of the write operation to write new content data to MB(3,1) and to update parity data in PB_Col1, in PB_Row3, and PB_Crn.

Figure 5:
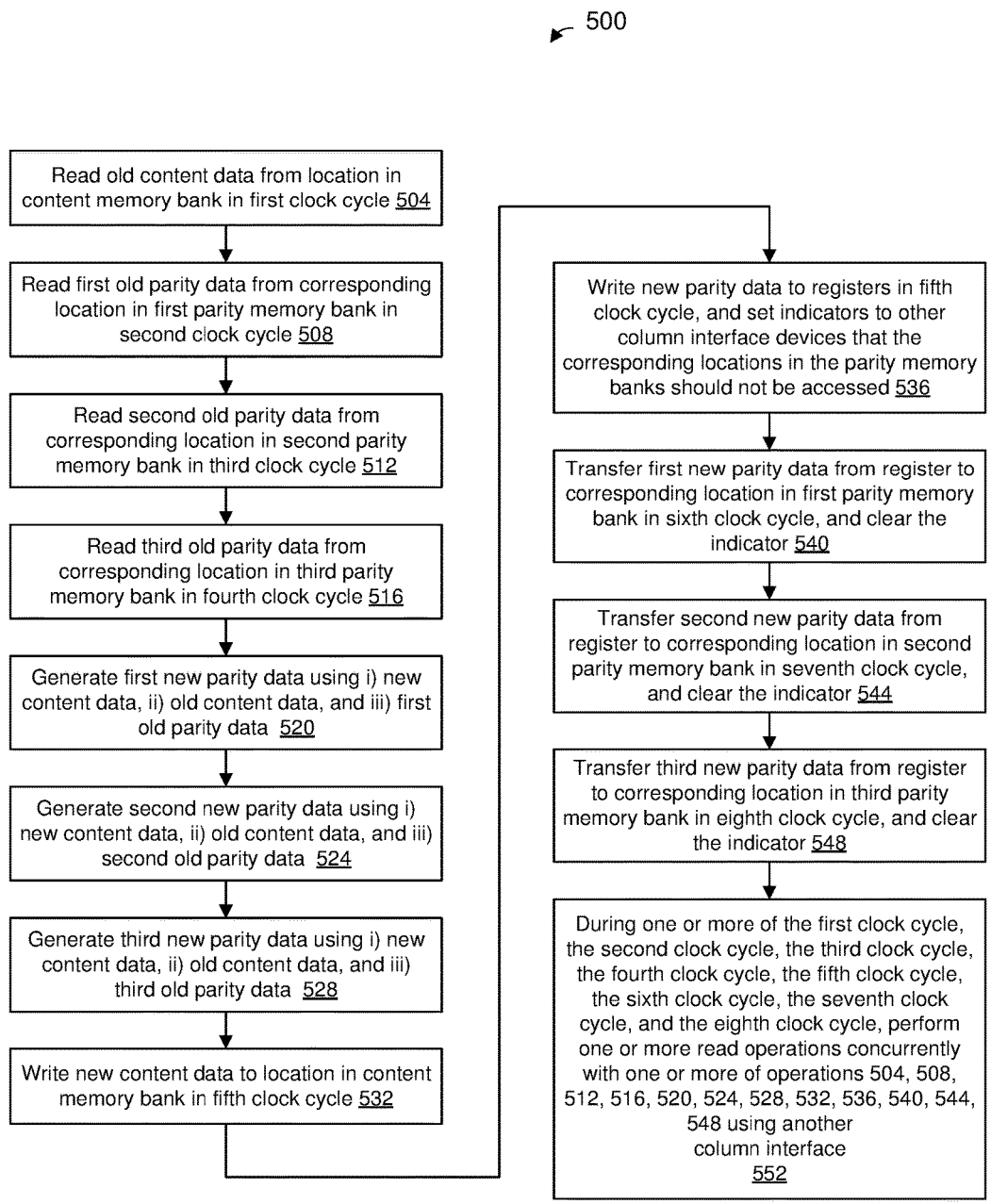
FIG. 5 is a flow diagram of an example method of writing data to the memory device of FIG. 4, according to an embodiment.

FIG. 5 is a flow diagram of an example method 500 of performing, over multiple clock cycles, a write operation with a memory device having multiple memory banks concurrently with performing one or more read operations with the memory device, according to an embodiment. In an embodiment, write operations included in the method 500 can be implemented by a single column interface, thus keeping other column interfaces available for handling read requests concurrent with the performance of the write operation. Each column interface device 400 is configured to implement the write operations in the method 500, according to some embodiments, and the method 500 is described with reference to FIG. 4 for explanatory purposes. In other embodiments, however, the method 500 is implemented by another suitable memory device having multiple memory banks. Similarly, in some embodiments, each column interface device 500 is configured to implement another suitable method for performing a write operation with a memory device having multiple memory banks.

The method 500 is described, merely for explanatory purposes, in the context of the column interface 484-1 as performing a write operation to write content data to a particular addressable location in MB(2,1) (e.g., a particular row of MB(2,1) having an associated address). In other scenarios, a similar technique is utilized to perform a write operation to write content data to a particular addressable location one of MB(1,1), MB(3,1), or MB(4,1).

The method 500 includes writing new content data MB(2,1). Because new content data is being written to MB(2,1), however, corresponding new parity data also must be calculated and then stored to PB_Col1, PB_Row2, and PB_Crn, in an embodiment. The new parity data is calculated using i) the new content data, ii) old content data in MB(2,1) at a location that will be overwritten by the new content data, and iii) old parity data in PB_Col1, PB_Row1, and PB_Crn at locations that will be overwritten by the new parity data. Referring again to FIGS. 1 and 2, the memory device 100 included one parity memory and thus the method 200 entailed updating the one parity memory when new content data was written. With the two-dimensional structure of the memory device 400 of FIG. 4, however, each content memory bank corresponds with a column having an associated column parity memory bank, a row having an associated row parity memory bank, and a corner memory bank. Thus, unlike the method 200 of FIG. 2, the method 500 entails updating three parity memory banks each time new content memory is written to a content memory bank.

At block 504, old content data is read, in a first clock cycle, from a location in a first content memory bank at which new content data is to be written. For example, in an embodiment, the column interface device 484-1 reads old content data, in the first clock cycle, from a location in MB(2,1) at which new content data is to be written.

At block 508, first old parity data is read, in a second clock cycle, from a location in a first parity memory bank corresponding to the location in the first content memory bank at which the new content data is to be written. For example, in an embodiment, the column interface device 484-1 reads first old parity data, in the second clock cycle, from a location in PB_Col1 that corresponds to the location in MB(2,1) at which the new content data is to be written.

At block 512, second old parity data is read, in a third clock cycle, from a location in a second parity memory bank corresponding to the location in the first content memory bank at which the new content data is to be written. For example, in an embodiment, the column interface device 484-1 reads second old parity data, in the third clock cycle, from a location in PB_Row2 that corresponds to the location in MB(2,1) at which the new content data is to be written.

At block 516, third old parity data is read, in a fourth clock cycle, from a location in a third parity memory bank corresponding to the location in the first content memory bank at which the new content data is to be written. For example, in an embodiment, the column interface device 484-1 reads third old parity data, in the fourth clock cycle, from a location in PB_Crn that corresponds to the location in MB(2,1) at which the new content data is to be written.

By performing the read operations of blocks 504, 508, 512, and 516 in separate clock cycles, this permits the column interface 484-1 to handle all of the read operations of blocks 504, 508, 512, and 516, as opposed to requiring any of the other column interfaces 484 to perform some of the read operations of blocks 504, 508, 512, and 516, in an embodiment. Thus, by the column interface 484-1 performing the read operations of blocks 504, 508, 512, and 516 in separate clock cycles, this frees up the other column interfaces 484 for handling other memory operations during those clock cycles, in an embodiment.

In some other embodiments, however, two or more of the blocks 504, 508, 512, and 516 are performed in a single clock cycle.

At block 520, first new parity information is generated using i) the new content data, ii) the old content data read at block 504, and iii) the first old parity data read at block 508. For example, in an embodiment, the column interface device 484-1 generates the first new parity data by XORing together i) the new content data, ii) the old content data read at block 504, and iii) the first old parity data read at block 508.

At block 524, second new parity information is generated using i) the new content data, ii) the old content data read at block 504, and iii) the second old parity data read at block 512. For example, in an embodiment, the column interface device 484-1 generates the second new parity data by XORing together i) the new content data, ii) the old content data read at block 504, and iii) the second old parity data read at block 512.

At block 528, third new parity information is generated using i) the new content data, ii) the old content data read at block 504, and iii) the third old parity data read at block 516. For example, in an embodiment, the column interface device 484-1 generates the third new parity data by XORing together i) the new content data, ii) the old content data read at block 504, and iii) the first old parity data read at block 516.

At block 532, the new content data is written, in a fifth clock cycle, to the location in the first content memory bank. For example, in an embodiment, the column interface device 484-1 writes the new content data, in the fifth clock cycle, to the location in MB(2,1).

At block 536, also during the fifth clock cycle, the first new parity data is written to a first register associated with the first parity memory bank, the second new parity data is written to a second register associated with the second parity memory bank, and the third new parity data is written to a third register associated with the third parity memory bank. For example, in an embodiment, the column interface device 484-1 writes the first new parity data, in the fifth clock cycle, to the register Reg_col1. Also, an indicator to another memory interface device that the corresponding location in the first parity memory bank should not be accessed is set. For example, in an embodiment, the column interface device 484-1 sets the indicator. In various embodiments, the indicator includes an address of the corresponding location in the first parity memory bank, a row number corresponding to the location in the first parity memory bank, an identifier of a corresponding element in a memory array of the first parity memory bank, etc. In some embodiments, the indicator is included in the register Reg_col1. For example, in an embodiment, a first part of the register Reg_col1 is used to store the indicator, and a second part of the register Reg_col1 is used to store the first new parity data. In another embodiment, a register separate from Reg_col1, and associated with the first parity memory bank, is used to store the indicator.

Similarly, in an embodiment, the column interface device 484-1 writes the second new parity data, in the fifth clock cycle, to the register Reg_row2 associated with PB_Row1, and sets an indicator associated with Reg_row2 that indicates that the corresponding location in PB_Row2 should not be accessed. Similarly, in an embodiment, the column interface device 484-1 writes third second new parity data, in the fifth clock cycle, to the register Reg_crn associated with PB_Crn, and sets an indicator associated with Reg_crn that indicates that the corresponding location in PB_Crn should not be accessed.

After operation 536 is completed, the new content data in MB(2,1) is available to column interfaces 484 even though the entire write procedure 500 has not been completed; and if data from MB(2,1) needs to be reconstructed, the new parity data in Reg_col1, Reg_row2, and Reg_crn is available to the column interfaces 484 for reconstructing the new content data using the new parity data even though the entire write procedure 500 has not been completed.

At block 540, the first new parity data is transferred, during a sixth clock cycle, from the first register associated with the first parity memory bank to the corresponding location in the first parity memory bank. For example, in an embodiment, the column interface device 484-1 transfers the first new parity data, in the sixth clock cycle, from the register Reg_col1 to the corresponding location in PB_Col1. Also, the indicator associated with Reg_col1 and set at block 536 is cleared. For example, in an embodiment, the column interface device 484-1 clears the indicator. In embodiments in which, the indicator includes an address of the corresponding location in the first parity memory bank, a row number corresponding to the location in the first parity memory bank, an identifier of the corresponding element in a memory array of the first parity memory bank, etc., block 540 includes setting the address, row number, element identifier, etc., to a predetermined value such as zero or some other suitable value to inform another memory interface device that the indicator is not set.

At block 544, the second new parity data is transferred, during a seventh clock cycle, from the second register associated with the second parity memory bank to the corresponding location in the second parity memory bank. For example, in an embodiment, the column interface device 484-1 transfers the second new parity data, in the seventh clock cycle, from the register Reg_row2 to the corresponding location in PB_Row2. Also, the indicator associated with Reg_row2 and set at block 536 is cleared.

At block 548, the third new parity data is transferred, during an eighth clock cycle, from the third register associated with the third parity memory bank to the corresponding location in the third parity memory bank. For example, in an embodiment, the column interface device 484-1 transfers the third new parity data, in the eighth clock cycle, from the register Reg_crn to the corresponding location in PB_Crn. Also, the indicator associated with Reg_crn and set at block 536 is cleared.

Performance of the write operations of blocks 540, 544, and 548 in separate clock cycles, permits the column interface 484-1 to handle all of the write operations of blocks 540, 544, and 548, as opposed to requiring any of the other column interfaces 484 to perform some of the read operations of blocks 540, 544, and 548, in an embodiment. Thus, by the column interface 484-1 performing the write operations of blocks 540, 544, and 548 in separate clock cycles, the other column interfaces 484 are freed up for handling other memory operations during those clock cycles, in an embodiment.

In some other embodiments, however, two or more of the blocks 540, 544, and 548 are performed in a single clock cycle.

The method 500 includes operation 552, which comprises performing one or more read operations with one or more of the column interfaces 484-2, 484-3, 484-4, and 484-5 concurrently with the column interface 484-1 performing one or more of operations 504, 508, 512, 516, 520, 524, 528, 532, 536, 540, 544, 548. For example, in an embodiment, any of the column interfaces 484-2, 484-3, 484-4, and 484-5 can service a read request during the first clock cycle (operation 504). If the read request is for reading content from MB(2, 1), MB(2,1) is blocked during the first clock cycle (because the column interface 484-1 is reading from MB(2,1)), but the column interfaces 484-2, 484-3, 484-4, and 484-5 retrieve content data from other memory banks in the same row (e.g., MB(2,2), MB(2,3), and MB(2,4)) and parity data from PB_Row2, so that the requested data from MB(2,1) can be reconstructed using the content data retrieved from the other memory banks in the same row (e.g., MB(2,2), MB(2,3), and MB(2,4)) and the parity data from PB_Row2.

As another example, in an embodiment, during the second clock cycle (operation 508) the column interface 484-1 is busy reading from PB_Col1, and the column interface 484-1 is not available to read from any memory bank in the same column. However, any of the column interfaces 484-2, 484-3, 484-4, and 484-5 can service a read request during the first clock cycle (operation 504). If the read request is for reading content from any memory bank in column 1, the column interfaces 484-2, 484-3, 484-4, and 484-5 retrieve content data from other memory banks in the same row (e.g., MB(2,2), MB(2,3), and MB(2,4)) and parity data from a corresponding one of PB_Row1, PB_Row2, PB_Row3, or PB_Row4, so that the requested data from the first column can be reconstructed using the content data retrieved from the other memory banks in the same row and the parity data from the corresponding one of PB_Row1, PB_Row2, PB_Row3, or PB_Row4.

As yet another example, in an embodiment, any of the column interfaces 484-2, 484-3, 484-4, and 484-5 can service a read request during the third clock cycle (operation 512). If the read request involves reading content from PB_Row2, PB_Row2 is blocked during the third clock cycle (because the column interface 484-1 is reading from PB_Row2), but the column interface 484-5 retrieve parity data from other memory banks in the same column (e.g., PB_Row1, PB_Row3, PB_Row4, and PB_Crn), so that the requested data from PB_Row2 can be reconstructed using the parity data retrieved from the other memory banks in the same column (e.g., PB_Row1, PB_Row3, PB_Row4, and PB_Crn.

As yet another example, in an embodiment, any of the column interfaces 484-2, 484-3, 484-4, and 484-5 can service read requests during the sixth clock cycle (operation 540). If the read request is for reading content from MB(2, 1), the column interface 484-1 is busy transferring new parity data from Reg_col1 to PB_Col1, and the column interface 484-1 is not available to read from any memory bank in the same column. However, any of the column interfaces 484-2, 484-3, 484-4, and 484-5 can service a read request during the sixth clock cycle (operation 540). If the read request is for reading content from the location in MB(2,1) to which new content data is being written, the column interfaces 484-2, 484-3, 484-4, and 484-5 retrieve content data from other memory banks in the same row (e.g., MB(2,2), MB(2,3), and MB(2,4)) and parity data from Reg_row2, so that the requested data from MB(2,1) can be reconstructed using the content data retrieved from the other memory banks in the same row and the parity data from Reg_row2. The column interface 484-5 knows to use parity data in Reg_row2 rather than parity data in PB_Row2 itself because of the indicator set during operation 536.

Referring again to FIG. 4, in an embodiment, the memory device 400 is configured to handle up to four simultaneous read operations, but each column interface 484 is configured to handle at most two simultaneous read operations. In such an embodiment, the memory interface control device 492 is configured to distribute read requests amongst the column interfaces 484 so that no column interface 484 is provided more than two read requests in a single clock cycle. For instance, in an embodiment, if three read requests correspond to memory banks in a single column, the memory interface control device 492 sends two of the read requests to the corresponding column interface 484, but instructs other column interface devices 484 to retrieve other content data from other columns and row parity data so that the memory interface control device 492 can reconstruct the data corresponding to the third read request.

Figure 6:
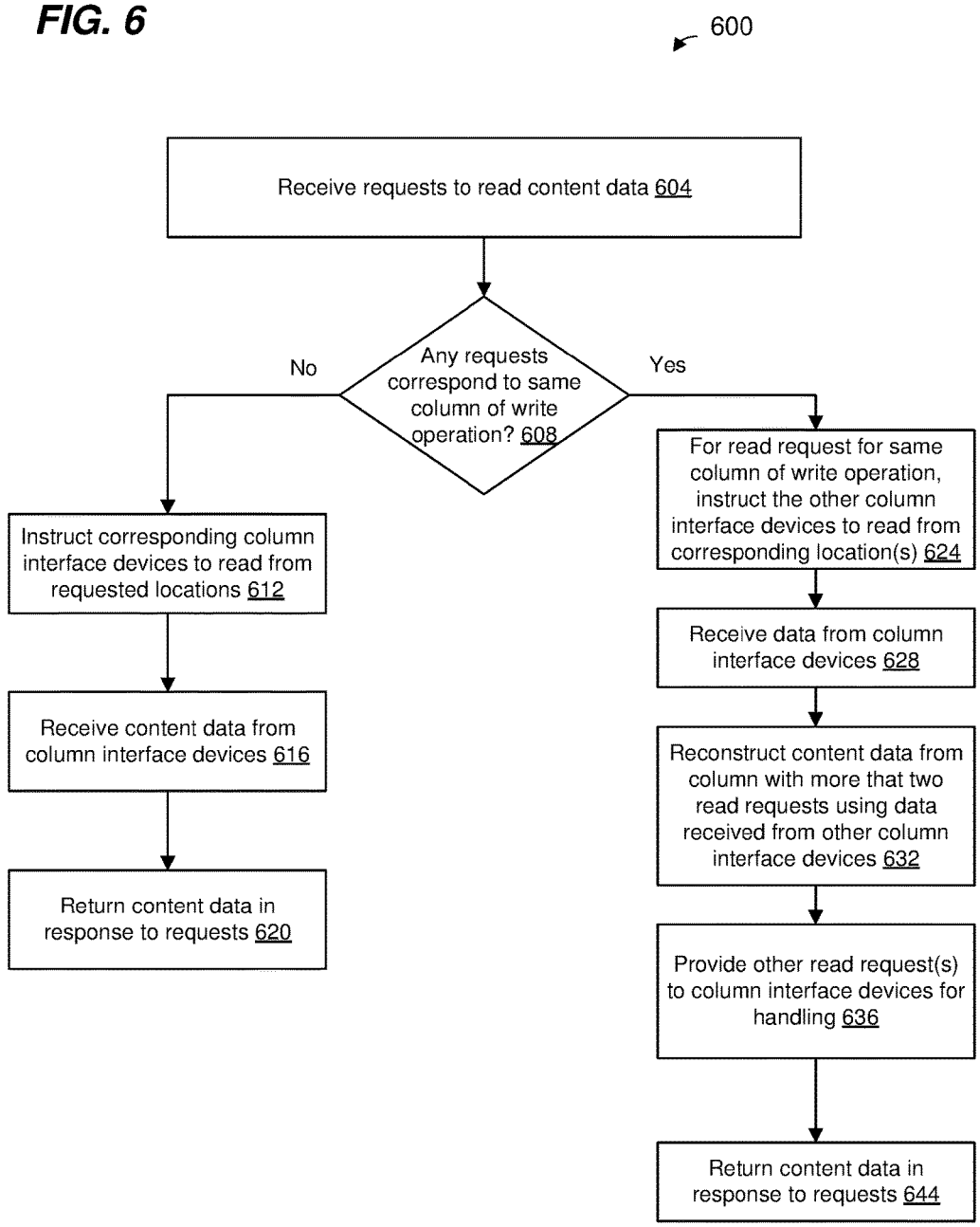
FIG. 6 is a flow diagram of an example method of reading data from the memory device of FIG. 5, according to an embodiment.

FIG. 6 is a flow diagram of an example method 600 of handling simultaneous read operations performed by the memory interface control device 492, according to an embodiment, concurrently with the memory device 400 performing a write operation. Example operation of each column interface 484, according to an embodiment, will be described with reference to FIG. 7.

At block 604, the memory interface control device 492 receives a plurality of requests to read content data. For example, in an embodiment, the memory interface control device 492 is configured to receive, concurrently, up to three read requests from up to three client devices while a write operation is being performed.

At block 608, the memory interface control device 492 determines whether any of the read requests received at block 604 correspond to reading from a column in which the corresponding column interface 484 is performing a write operation. For example, in an embodiment, if column interface 484-1 is performing a write operation such as described with reference to FIG. 5, and the memory interface control device 492 determines whether any of the read requests received at block 604 are for content in the first column. If it is determined at block 608 that none of the read requests received at block 604 corresponds to the column in which the column interface is performing a write operation, the flow proceeds to block 612.

At block 612, the memory interface control device 492 instructs corresponding column interface devices 484 to perform read operations corresponding to the read requests received at block 604. In an embodiment, block 612 includes the memory interface control device 492 distributing the read requests received at block 604 to corresponding column interface devices 484 for further handling of the read requests. In another embodiment, block 612 includes the memory interface control device 492 sending instructions to corresponding column interface devices 484 to read data at locations corresponding to the read requests received at block 604. As an illustrative example, if a first read request corresponds to MB(2,2), a second read request corresponds to MB(3,2), and a third read request corresponds to MB(2,3), the memory interface control device 492 causes the column interface device 484-2 to perform read operations corresponding to the first read request (MB(2,2)) and the second read request (MB(3,2)). Continuing with this example, the memory interface control device 492 causes the column interface device 484-3 to perform a read operation corresponding to the third read request (MB(2,3)).

At block 616, the memory interface control device 492 receives content data from the column interface devices 484 in response to the read operations performed by the column interface devices 484 in response to block 612. At block 620, the memory interface control device 492 responds to the read requests received at block 604 with the content data received from the column interface devices 484 at block 616.

If, on the other hand, it is determined at block 608 that any of the read requests received at block 604 corresponds to reading from a column in which the corresponding column interface is performing a write operation, the flow proceeds to block 624.

At block 624, for a read request corresponding to the same column as the write operation, the memory interface control device 492 instructs the column interface devices corresponding to the other columns to perform read operations in memory banks at corresponding locations so that the content data can be reconstructed. For example, if one of the requests is to read from MB(2,1) at location m, then the memory interface control device 492 causes column interface device 484-2 to read from MB(2,2) at location m, interface device 484-3 to read from MB(2,3) at location m, interface device 484-4 to read from MB(2,4) at location m, and interface device 484-5 to read from PB_Row2 at location m so that the content data at location m of MB(2,1) can be reconstructed.

At block 628, the memory interface control device 492 receives data from the column interface devices 484 in response to blocks 624. The data received at block 628 includes data that will be used to reconstruct content data that is responsive to the read request for the same column in which a write operation is being performed. Continuing with the example described above, if one of the requests if to read from MB(2,1) at location m, then content data from MB(2,2) at location m, content data from MB(2,3) at location m, content data from MB(2,4) at location m, and parity data from PB_Row2 at location m will be used to reconstruct the content data at location m of MB(2,1). As will be described below, in some scenarios, column interface 484-5 will sometimes retrieve data from one of Reg_row1, Reg_row2, Reg_row3, Reg_row4, or Reg_crn instead of retrieving data from PB_Row1, PB_Row2, PB_Row3, PB_Row4, or PB_Crn, respectively.

At block 632, the memory interface control device 492 reconstructs content data using parity data received at block 628. For example, in an embodiment, the memory interface control device 492 reconstructs content data using parity data received from one or more column interface devices 484. Continuing with the example described above, content data from MB(2,1) at location m is reconstructed using content data from MB(2,2) at location m, content data from MB(2,3) at location m, content data from MB(2,4) at location m, and parity data from PB_Row2 at location m. For example, in an embodiment, content data from MB(2,1) at location m is reconstructed by XORing together content data from MB(2,2) at location m, content data from MB(2,3) at location m, content data from MB(2,4) at location m, and parity data from PB_Row4 at location m.

At block 628, other read requests received at block 604 are provided to the column interface devices that are not handling the concurrent write operation. At block 644, the memory interface control device 492 returns content data in response to the read requests received at block 604. For example, in an embodiment, the memory interface control device 492 returns both i) content data received from one or more column interface devices 484 and ii) reconstructed content data, in response to the read requests received at block 604.

Figure 7:
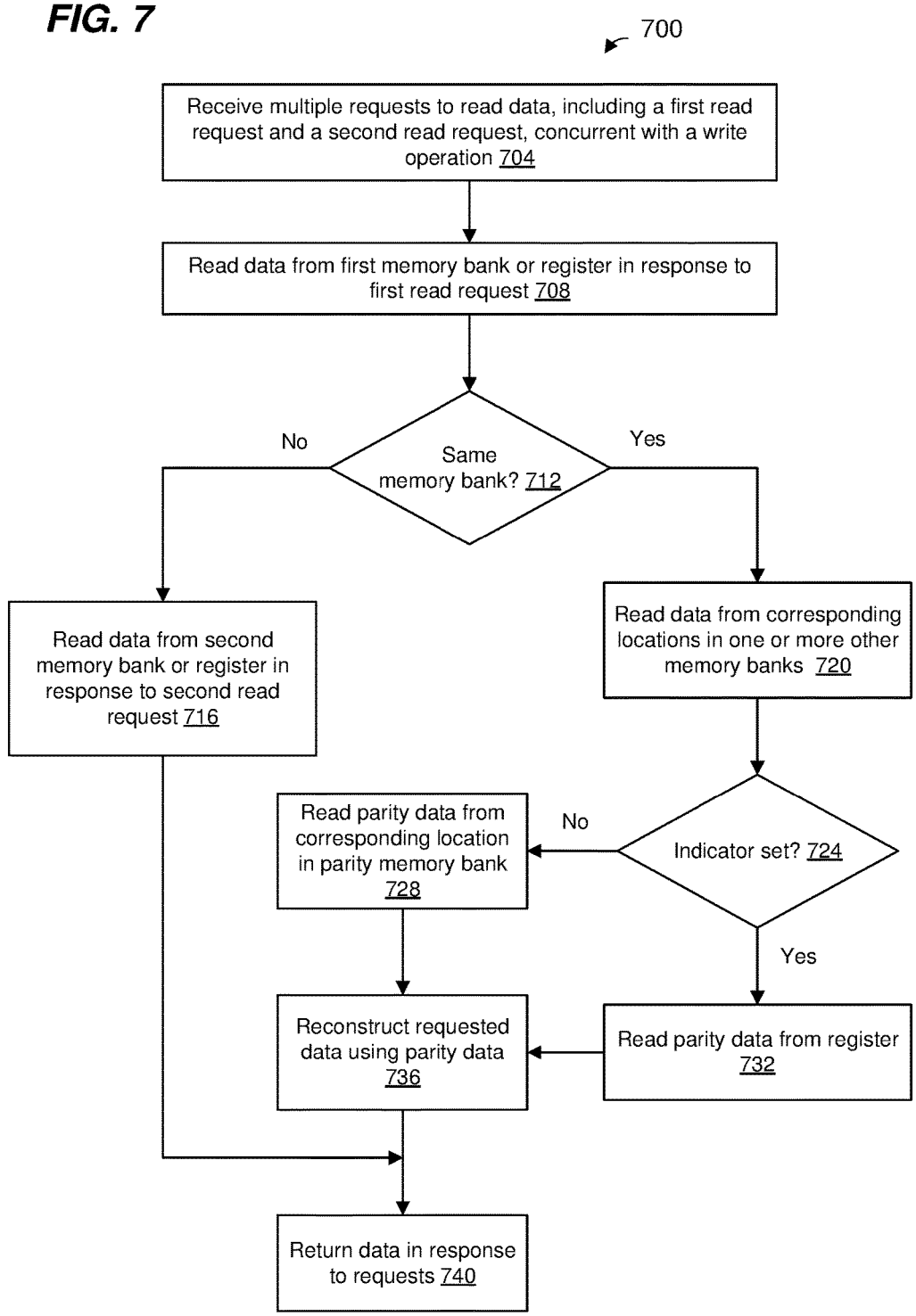
FIG. 7 is a flow diagram of another example method of reading data from the memory device of FIG. 5, according to an embodiment.

FIG. 7 is a flow diagram of an example method of 700 of handling simultaneous read operations with a memory device having multiple memory banks while a concurrent write operation is being performed, according to an embodiment. Each column interface device 484 of FIG. 4 is configured to implement the method 700, according to some embodiments, while another column interface 484 is concurrently performing a write operation. The method 700 is described with reference to FIG. 4 for explanatory purposes. In other embodiments, however, the method 700 is implemented by another suitable memory device having multiple memory banks. Similarly, in some embodiments, column interface devices 484 are configured to implement another suitable method for performing a read operation concurrently with another column interface 484 performing a concurrent write operation in a memory device having multiple memory banks.

The method 700 is described, merely for explanatory purposes, in the context of the column interface device 484-5 performing read operations to retrieve data from one or more of PB_Row1, PB_Row2, PB_Row3, and PB_Row4 while column interface device 484-1 is concurrently writing new content data to MB (2,1) and updating parity data in PB_Col1, PB_Row2, and PB_Crn. In other scenarios, similar techniques are utilized to perform read operations from a group of memory banks. For instance, the column interface device 484-1 uses a similar technique to retrieve data from MB(1,1), MB(2,1), MB(3,1), and MB(4,1); the column interface device 484-2 uses a similar technique to retrieve data from MB(1,2), MB(2,2), MB(3,2), and MB(4,2); the column interface device 484-3 uses a similar technique to retrieve data from MB(1,3), MB(2,3), MB(3,3), and MB(4,3); and the column interface device 484-4 uses a similar technique to retrieve data from MB(1,4), MB(2,4), MB(3,4), and MB(4,4).

At block 704, multiple requests to read data (e.g., a first read request and a second read request) at one or more locations in one or more memory banks among a group of memory banks are received concurrently while column interface device 484-1 is concurrently writing new content data to MB(2,1) and updating parity data in PB_Col1, PB_Row2, and PB_Crn. For example, in an embodiment, the column interface device 484-5 receives the first read request and the second read request to retrieve content data from one or more locations in one or more of PB_Row1, PB_Row2, PB_Row3, and PB_Row4.

At block 708, first data is read from a first memory bank or an associated register in response to the first read request. As an illustrative embodiment, the first read request is for reading data from location A in PB_Row2. In an embodiment, the column interface device 484-5 responsively checks whether an indicator is set to indicate that location A in PB_Row2 is out-of-date. If the indicator is not set, the column interface device 484-5 responsively reads data from location A in PB_Row2. On the other hand, if the indicator is set, column interface device 484-5 responsively reads data from Reg_row2.

In some embodiments, block 708 includes determining which of the memory requests received at block 704 is to be handled at block 708. For example, in an embodiment, each column interface device 484 includes a respective arbitrator circuit (not shown in FIG. 4), and the arbitrator circuit of the column interface device 484-2 determines which of the read requests received at block 704 is handled at block 708. In other embodiments, however, which of the read requests received at block 704 is handled at block 708 is predetermined. For example, in an embodiment, each column interface device 484 includes a respective first port and a respective second port for receiving read requests, and the read request received at the first port is always handled at block 708.

At block 712, it is determined whether the first read request and the second read request correspond to a same memory bank. In an embodiment, block 712 includes determining whether the memory bank to which the second read request corresponds is blocked. For example, in an embodiment, a corresponding flag is set to indicate that a particular memory bank is blocked due to handling of the first read request (e.g., at block 708). In another embodiment, each read request includes a respective indicator of the respective memory bank to be accessed, and block 712 includes comparing the indicators of the memory banks in the read requests to determine if they correspond to a same memory bank.

If it is determined at block 712 that the first read request and the second read request do not correspond to the same memory bank, the flow proceeds to block 716. At block 716, second data is read from a second memory bank in response to the second read request. As an illustrative embodiment, the second read request is for reading data from location B in PB_Row4. In an embodiment, the column interface device 484-5 responsively checks whether an indicator is set to indicate that location B in PB_Row4 is out-of-date. If the indicator is not set, the column interface device 484-5 responsively reads data from location B in PB_Row4. On the other hand, if the indicator is set, column interface device 484-5 responsively reads data from Reg_row4.

On the other hand, if it is determined at block 712 that the first read request and the second read request correspond to the same memory bank, the flow proceeds to block 720. At block 720, data from one or more other memory banks at corresponding location(s) is read. Continuing with the example above in which the first read request corresponds to location A in PB_Row2, in an embodiment, the column interface device 484-5 reads data from location A in PB_Row1, location A in PB_Row3, and location A in PB_Row4. In an embodiment, block 720 includes, for each parity memory bank to be read at block 7820, checking whether a respective indicator is set to indicate that data at the location to be read is out-of-date. If the indicator is not set, the column interface device 484-5 responsively reads data from parity bank. On the other hand, if the indicator is set, column interface device 484-5 responsively reads data from the associated register.

At block 724, it is determined whether an indicator that a corresponding location in a parity memory bank should not be accessed (e.g., because the parity information at that location is out-of-date) is set. For example, in an embodiment such as described above with reference to FIG. 4, another memory interface device (e.g., the column interface device 484-1) may set the indicator when the other memory interface device has stored new parity information in a register (e.g., the register Reg_crn) but has not yet transferred the new parity information to the location in the parity memory bank. In an embodiment, the circuit 488-5 of the column interface device 484-5 determines whether the indicator is set. In an embodiment, the indicator is stored in a first part of the register Reg_crn, and the circuit 488-5 analyzes the first part of the register Reg_crn to determine whether the indicator is set. In another embodiment, the indicator is stored in another register separate from the register Reg_crn, and the circuit 488-5 analyzes the other register to determine whether the indicator is set. In an embodiment, the indicator includes an address, row number, array element identifier, etc., of a corresponding element in the parity memory bank that should not be accessed (e.g., because the location has out-of-data information), and the circuit 488-5 compares the address, row number, identifier, etc., of the indicator to the corresponding address, row number, identifier, etc., of the location in the parity memory bank PB_Crn that the column interface device 484-5 is attempting to access.

Referring now to FIG. 4, in some embodiments, each circuit 488 includes a respective comparator circuit configured to compare i) an address, row number, element identifier, etc., corresponding to an element in the parity memory bank that is to be accessed with ii) an address, row number, element identifier, etc., included in or associated with the indicator that a corresponding location in parity memory bank should not be accessed (e.g., because the parity information at that location is out-of-date).

Referring again to FIG. 7, if it is determined at block 724 that the indicator is not set, the flow proceeds to block 728, at which parity data at the corresponding location in the parity memory bank is read. Continuing with the example above in which the first read request corresponds to location A in PB_Row2, in an embodiment, the column interface device 484-5 reads parity data from location A in PB_Crn.

On the other hand, if it is determined at block 724 that the indictor is set, the flow proceeds to block 732, at which parity data from a register associated with the parity memory bank is read. For example, in an embodiment, the column interface device 484-5 reads parity data from the register Reg_crn.

At block 736, the requested data is reconstructed using the data retrieved from the one or more memory banks at block 720 and either the parity data retrieved from the parity memory bank at block 728 or the parity data retrieved from the register at block 732. For example, in an embodiment, the column interface device 484-5 reconstructs the requested content data in PB_Row2 by XORing together i) the data retrieved from PB_Row1, ii) the data retrieved from PB_Row3, iii) the data retrieved from PB_Row4, and iii) either the parity data retrieved from PB_Crn or the parity data retrieved from the register Reg_crn.

At block 740, the requests received at block 704 are responded to with i) the data retrieved at block 708, and ii) either a) data retrieved at block 716 or b) data reconstructed using parity data at block 736. In an embodiment, the column interface device 484-5 responds to the read requests received at block 704 with data retrieved at block 708 and either i) data retrieved at block 728 or reconstructed using parity data at block 736.

Although the method 700 was discussed in the context of the memory device 400 of FIG. 4, in other embodiments, the method 700 is implemented by other suitable devices. For example, in an embodiment, the read/write interface devices 120 of FIG. 1 are configured to implement the method 700.

Similarly, although the method 200 was discussed in the context of the memory device 100 of FIG. 1, in other embodiments, the method 200 is implemented by other suitable devices. For example, in an embodiment, each column interface device 484 of FIG. 4 is configured to implement the method 200.

Similarly, although the method 300 was discussed in the context of the memory device 100 of FIG. 1, in other embodiments, the method 300 is implemented by other suitable devices. For example, in an embodiment, each column interface device 484 of FIG. 4 is configured to implement the method 300.

In other embodiments, the same and/or similar techniques for writing to and reading from a multi-bank memory device are utilized in memory devices with memory banks configured as arrays having three or more dimensions.

In various embodiments, methods and apparatus such as described herein are suitable wherever several client devices, such as processors, processor cores, circuits, pipeline stages, etc., need to simultaneously perform memory operations, such as a read operation or another suitable operation, on a shared memory. As merely an illustrative example, memory apparatus methodologies such as describe above are suitable for use in communication network devices.

Although methods and apparatus described above were in the context of generating parity data using XOR, in other embodiments, other suitable ECCs are utilized. For example, referring to FIG. 1, in an embodiment, parity data in the i-th row of PB 112 is calculated by applying a Reed-Solomon code to content data in the i-th row of MB1 with content data in the i-th row of MB2. Thus, in an embodiment, content data in the i-th row of one of MB1 104 or MB2 108 can be reconstructed by applying a Reed-Solomon decoding operation to i) content data in the i-th row of the other one of MB1 104 or MB2 108, and ii) parity data in the i-th row of PB 112.

Figure 8:
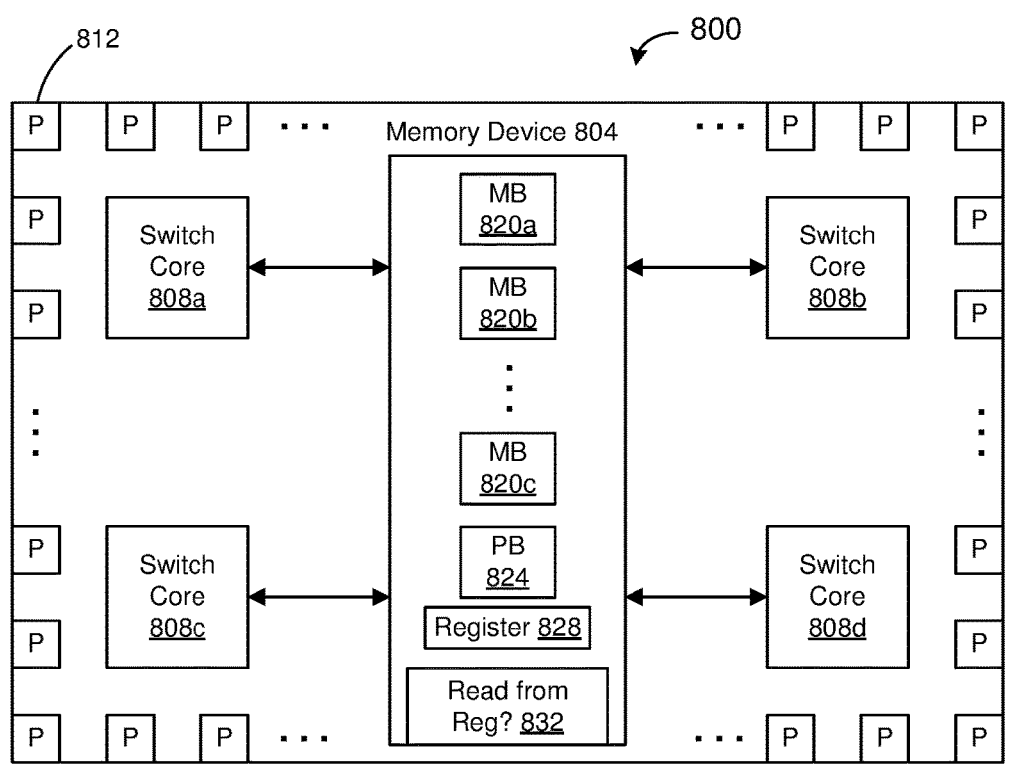
FIG. 8 is a block diagram of an example network device including a shared access memory, according to an embodiment.

FIG. 8 is a block diagram of an example multi-core network device 800, such as a Layer-2 and/or Layer-3 switch, according to an embodiment. The network device 800 includes a memory device 804 coupled to and utilized by multiple packet processing cores 808, also referred to herein as switch cores or switching cores, as will be described in more detail below. The network device 800 also includes a plurality of ports 812, and each port 812 is coupled to a respective communication link associated with one or more communication networks. The packet processing cores 808 are configured to process packets received via the ports 812 and to determine respective ports 812 via which the packets should be subsequently transmitted, in an embodiment.

The packet processing cores 808 utilize one or more control tables, such as a forwarding database table, that are stored in the memory device 804, in an embodiment. Because the packet processing cores 808 operate in parallel, two or more of the cores 808 may need to perform memory operations on a same portion of the memory device 804 simultaneously, for example to perform simultaneous read operations to obtain forwarding information for packets that come from, or that are destined for, the same address.

As will be described above, the memory device 804 includes a first set of memory banks 820 to store content data, such as one or more control tables, in an embodiment. The memory device 804 also includes a second set of one or more memory banks 824 to store redundancy information associated with content data stored in the first set of memory banks 820. When the memory device 804 simultaneously receives (e.g., during a same clock cycle of the memory device 804) multiple requests to perform memory operations in one of the memory banks 820, the memory device 804 is configured to determine that one or more of the multiple requests is blocked from accessing the one memory bank 820, in an embodiment. In response to determining that one or more of the multiple requests was blocked from accessing the one memory bank 820, the memory device 804 is configured to access redundancy data from the memory bank 824 and to reconstruct data stored in the one memory bank 820 using the redundancy data and without using data stored in the one memory bank 820. One of the requested memory operations is performed using data stored in the one memory bank 820. On the other hand, another one of the requested memory operations is performed without accessing the one memory bank 820 and based on the data reconstructed using the redundancy data from the memory bank 824, in an embodiment.

In the network device 800, each packet processing core 808 generally acts as a client that generates requests to perform memory operations in one or more memory banks 820 of the memory device 804. The term "client," as used herein, refers to a device configured to generate requests to perform memory operations in one or more memory banks of a memory device. In an embodiment in which a packet processing core 808 includes multiple devices (e.g., circuits) each configured to generate requests to perform memory operations in one or more memory banks 820 of the memory device 804, then the packet processing core 808 includes or acts as multiple clients. For example, in an embodiment in which a packet processor includes a pipeline with a plurality of pipeline stages, and multiple pipeline stages are configured to generate requests to perform memory operations in one or more memory banks of a memory device, the packet processor includes or acts as multiple clients. As another example, a single processor or single pipeline stage is configured to generate simultaneously multiple memory access requests, and thus the single processor or single pipeline stage includes or acts as multiple clients.

In an embodiment, the memory device 804 is a solid-state device. For example, the memory device 804 is included on an integrated circuit (IC) or other solid-state device. In an embodiment, the memory device 804 and the packet processing cores 808 are included on a single IC.

In various embodiments, the memory device 804 includes one or more registers 828 associated with the parity memory bank 824 to temporarily store parity information before the parity information is transferred to the parity memory bank 824. In various embodiments, the memory device 804 includes a circuit 832 configured to determine whether parity information should be read from the register 828 rather than the parity memory bank 824. In an embodiment, the memory device 804 includes the memory device 100 of FIG. 1. In another embodiment, the memory device 804 includes the memory device 400 of FIG. 4.

Although the memory device 804 is discussed above as being included the network device 800, similar memory devices may be utilized in other types of computing systems such as personal computers, servers, mainframes, smart phones, gaming systems, set top boxes, communication equipment, etc. For example, a computing system may include multiple devices (e.g., processors (e.g., central processing units, coprocessors, special-purpose processing units, etc.), circuits, pipeline stages, etc.) that each act as a client with respect to a memory device such as the memory device 804.

The various blocks, operations, and techniques described above may be implemented in hardware. When implemented in hardware, the hardware may comprise one or more of i) discrete components, ii) one or more integrated circuits, iii) one or more application-specific integrated circuits (ASICs), one or more programmable logic devices (PLDs), etc.

Some of the various blocks, operations, and techniques described above may be implemented in a processor executing firmware and/or software instructions, or any combination thereof. When implemented at least partially by utilizing a processor executing software or firmware instructions, the executable software or firmware instructions may be stored in any non-transitory, tangible, computer readable or machine readable medium, or media, such as on a magnetic disk, an optical disk, a RAM, a ROM, a flash memory, a magnetic tape, etc. The software or firmware instructions may include computer readable or machine readable instructions that, when executed by one or more processors, cause the one or more processors to perform various acts. When implemented in hardware, the hardware may comprise one or more of i) discrete components, ii) one or more integrated circuits, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a set of content memory banks configured to store content data, the set of content memory banks including a first memory bank;
a parity memory bank corresponding to the set of content memory banks configured to store parity information;
a first memory interface configured to:
perform a write operation to write new content data to a location in a first content memory bank in a plurality of partial write operations that are spread over two or more clock cycles, the plurality of partial write operations including:
reading old content data from the location in the first content memory bank during a first clock cycle,
generating new parity information for the new content data using the old content data, and
storing the new parity information to the parity memory bank in a second clock cycle after the first clock cycle; and
a second memory interface configured to perform a read operation, independently of reading old content data of the plurality of partial write operations, at the location in the first content memory bank concurrently while the first memory interface is performing at least one of the plurality of partial write operations.

2. The network device of claim 1, further comprising:
a register corresponding to the parity memory bank;
wherein the first memory interface configured to temporarily store the new parity information generated in one of the partial write operations in the register before the parity information is written to the parity memory bank in a second clock cycle after the first clock cycle; and
wherein the second memory interface is configured to perform the read operation at the location in the first content memory bank at least by:
determining that the first content memory bank cannot be accessed because a concurrent memory operation is being performed using the first content memory bank, and
in response to determining that the first content memory bank cannot be accessed, selectively using information from one of i) the register or ii) a location in the parity memory bank, to reconstruct the stored content information at the location in the first content memory bank.

3. The network device of claim 2, wherein the first memory interface is configured to:
perform a partial write operation to write the new content data to the location in the first content memory bank in a third clock cycle after the first clock cycle.

4. The network device of claim 3, wherein:
the first memory interface device is configured to perform a partial write operation to write the parity information to the register in the third clock cycle.

5. The network device of claim 2, wherein the second memory interface device is configured to:
determine whether an indicator is set to indicate that the information at the location in the parity memory bank is out of date;
use information from the register to reconstruct the stored content information at the location in the first content memory bank in response to determining that the indicator is set to indicate that the information at the location in the parity memory bank is out of date; and
use information from the parity memory bank to reconstruct the stored content information at the location in the first content memory bank in response to determining that the indicator is not set to indicate that the information at the location in the parity memory bank is out of date.

6. The network device of claim 5, wherein:
the first memory interface device is configured to:
store the new parity information in a first portion of the register, and
store the indicator in a second portion of the register; and
the second memory interface device is configured to examine the second portion of the register to determine whether the indicator is set to indicate that the information at the location in the parity memory bank is out of date.

7. The network device of claim 5, wherein:
the indicator includes a memory address; and
the second memory interface device is configured to determine whether the indicator is set to indicate that the information at the location in the parity memory bank is out of date based on comparing an address corresponding to the read request with the memory address included in the indicator.

8. The network device of claim 1, wherein the first memory interface is configured to:
perform a partial write operation to read old parity information from the location in the parity memory bank in a third clock cycle after the first clock cycle and before the second clock cycle;
generate the new parity information for the new content data further using the old parity information.

9. The network device of claim 1, wherein the first memory interface and the second memory interface are configured to simultaneously handle two concurrent read requests for the first content memory bank received in a single clock cycle.

10. The network device of claim 1, wherein the first memory interface and the second memory interface are components of a read/write interface device configured to simultaneously handle four concurrent read requests for the first content memory bank received in a single clock cycle.

11. A method of reading and writing data to a memory device of a network device, comprising:
performing, with a first memory interface device, a write operation in a plurality of partial write operations spread over multiple clock cycles to write new content data to a location in a first content memory bank among a set of multiple content memory banks, the plurality of partial write operations including:
reading old content data from the location in the first content memory bank during a first clock cycle,
generating new parity information using the old content data, and
writing the new parity information to a location in a parity memory bank in a second clock cycle after the first clock cycle; and
performing, with a second memory interface, a concurrent read operation, independently of reading old content data of the two or more partial write operations, at the location in the first content memory bank while the first memory interface is performing at least one of the plurality of partial write operations.

12. The method of claim 11, wherein:
the plurality of partial write operations further includes writing the new parity information to a register;
writing the new parity information to the location in the parity memory bank comprises transferring the new parity information from the register to the location in the parity memory bank in the second clock cycle after the first clock cycle; and
performing the concurrent read operation comprises:
determining that the first content memory bank cannot be accessed because a concurrent memory operation is being performed using the first content memory bank, and
selectively using information from one of i) the register or ii) the location in the parity memory bank, to reconstruct the stored content information in the first content memory bank.

13. The method of claim 12, wherein:
the plurality of partial write operations further includes:
in conjunction with writing the new parity information to the register, setting an indicator for other memory interface devices that parity information at the location in the parity memory bank is out of date, and
in conjunction with transferring the new parity information from the register to the location in the parity memory bank, clearing the indicator; and
performing the read operation comprises:
in response to determining that the indicator is set to indicate that the parity information at the location in the parity memory bank is out of date, using information from the register to reconstruct the stored content information in the first content memory bank, and
in response to determining that the indicator is not set to indicate that the parity information at the location in the parity memory bank is out of date, using information at the location in the parity memory bank to reconstruct the stored content information in the first content memory bank.

14. The method of claim 13, wherein setting the indicator includes setting the indicator to an address of the location in the parity memory bank to indicate that parity data at the address in the parity memory bank is out of date; and
wherein determining whether the indicator is set to indicate that the parity information at the location in the parity memory bank is out of date comprises comparing the address corresponding to the indicator to an address corresponding to the read operation.

15. The method of claim 13, wherein:
writing the new parity information to the register comprises writing the new parity information to a first portion of the register; and
setting the indicator comprises writing a value to a second portion of the register.

16. The method of claim 12, wherein the plurality of partial write operations further includes:
writing the new content data to the location in the first content memory bank in a third clock cycle after the first clock cycle.

17. The method of claim 16, wherein writing the parity information to the register is performed in the third clock cycle.

18. The method of claim 17, wherein the third clock cycle is before the second clock cycle.

19. The method of claim 11, wherein:
the plurality of partial write operations further includes reading old parity information from the location in the parity memory bank in a third clock cycle after the first clock cycle and before the second clock cycle; and
generating the new parity information for the new content data includes using the old parity information.

20. The method of claim 11, wherein the plurality of partial write operations further includes:
writing the new content data to the location in the first content memory bank in a third clock cycle after the first clock cycle and before the second clock cycle.

* * * * *